United States Patent [19]
Hisano et al.

[11] Patent Number: 6,104,524
[45] Date of Patent: Aug. 15, 2000

[54] OPTICAL SCANNING DEVICE

[75] Inventors: Tohru Hisano, Ebina; Akira Ishii; Koichiro Shinohara, both of Kanagawa, all of Japan

[73] Assignee: Fuji Xerox Co., Ltd., Tokyo, Japan

[21] Appl. No.: 09/229,176

[22] Filed: Jan. 13, 1999

[30] Foreign Application Priority Data

Jan. 16, 1998 [JP] Japan .................................. 10-006934

[51] Int. Cl.$^7$ .................................................. G02B 26/08
[52] U.S. Cl. ......................... 359/216; 359/204; 347/239
[58] Field of Search .................................. 359/216, 217, 359/218, 219, 204; 347/239, 243, 255, 259, 260, 261

[56] References Cited

U.S. PATENT DOCUMENTS

| | | | |
|---|---|---|---|
| 5,223,700 | 6/1993 | Takenaka | 359/217 |
| 5,353,048 | 10/1994 | Kanai | 346/108 |
| 5,355,244 | 10/1994 | Suzuki et al. | 359/212 |

FOREIGN PATENT DOCUMENTS

A-3-2773  1/1991  Japan .
A-9-169136  6/1997  Japan .

*Primary Examiner*—Cassandra Spyrou
*Assistant Examiner*—Euncha Cherry
*Attorney, Agent, or Firm*—Oliff & Berridge, PLC

[57] ABSTRACT

A polygon mirror 36 have reflecting surfaces being arrayed such that the reflecting surfaces each having coatings 38 at both ends thereof and the reflecting surfaces having no coating are alternately arrayed. A beam width of a light beam reflected by a coating facet 36A is smaller than a beam width of a light beam by a non-coating facet 36B. A light beam (first light beam) is deflected by the coating facet 36A, and it lands on a photoreceptor. A light beam (second light beam) is deflected by the non-coating facet 36B, and it lands on the photoreceptor. At this time, a beam diameter of the first light beam on the photoreceptor in the first scan direction is larger than that of the second light beam. When the laser beam is deflected by the non-coating facet 36B, the laser beam is modulated by image data. When it is deflected by the coating facet 36A, the laser beam is modulated by bias data. Both the laser beams are projected to over the entire surface of a projected object within the scanning area, whereby an electrostatic latent image of high contrast is formed on the object surface.

20 Claims, 15 Drawing Sheets

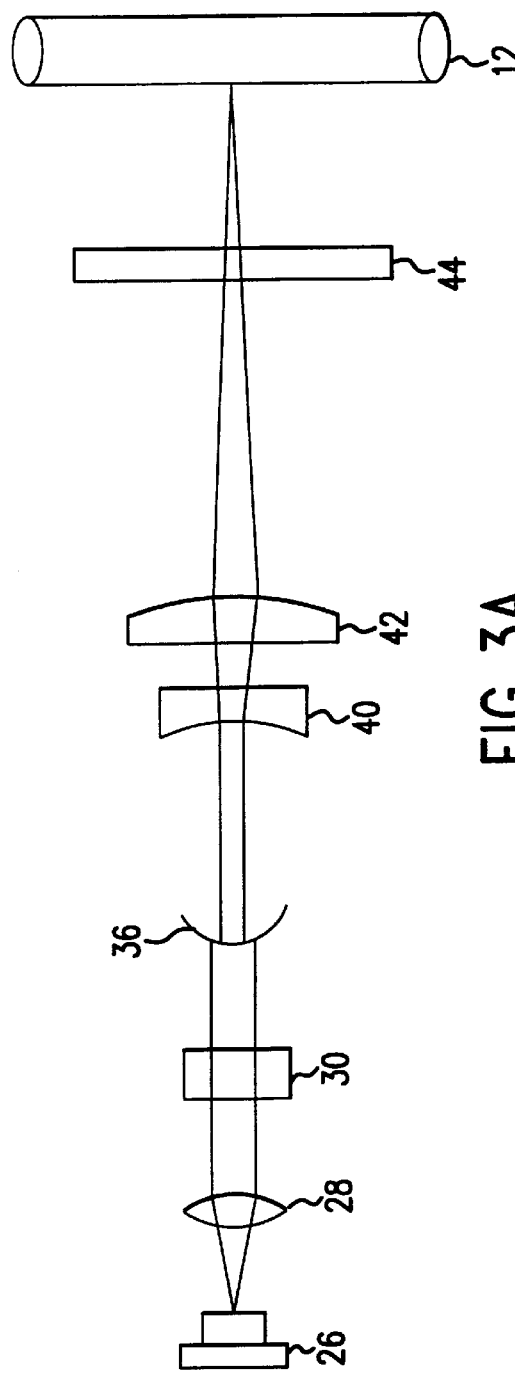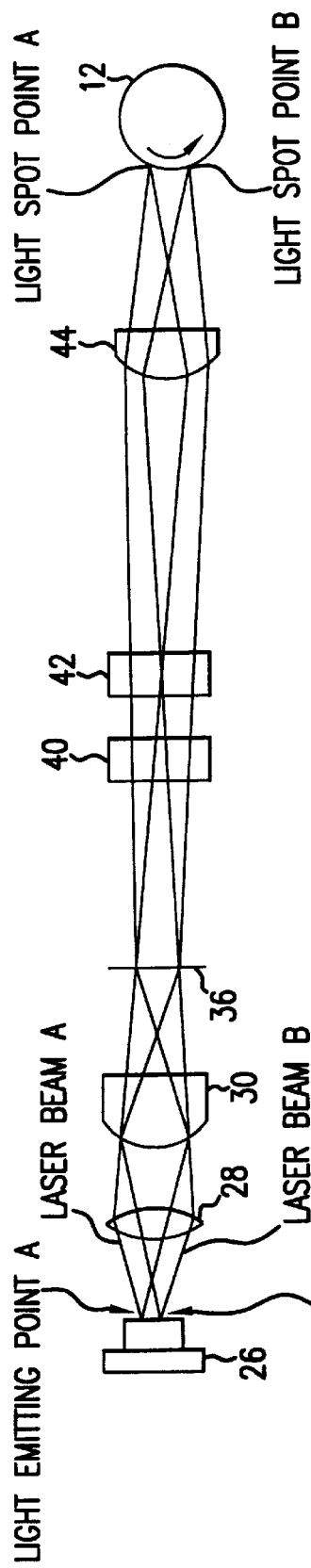
FIG. 3A
FIG. 3B

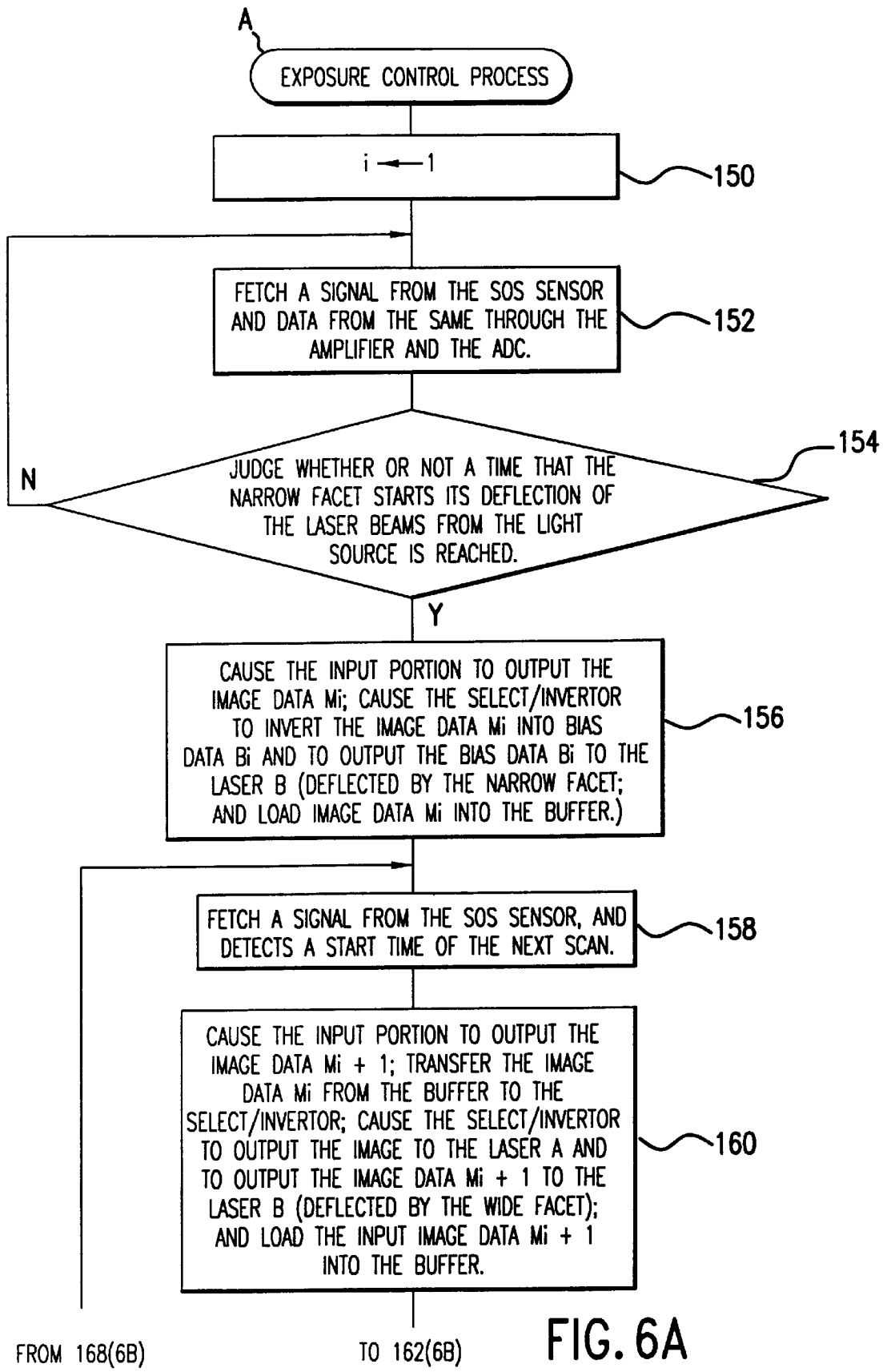

OPTICAL SCANNING DEVICE

BACKGROUND OF THE INVENTION

The present invention relates to an optical scanning device, and more particularly to an optical scanning device for scanning a target member with a light beam that is emitted from a light source and deflected by the polygon mirror.

An electrophotography image forming apparatus uses an exposure device exposes the surface of a charged photosensitive member or photoreceptor to light beams in accordance with an image to be formed thereon. An optical scanning device is a typical known exposure device. The scanning device modulates a light beam emitted from a light source, e.g., a laser diode (LD), by information of an image to be formed; deflects the modulated light beam by deflecting means, e.g., a rotating polygon mirror; scans the surface of the photoreceptor with the light beam through the deflection of the light beam; and depicts an electrostatic latent image on the photoreceptor.

The Unexamined Japanese Patent Application Publication No. Hei 3-2773 discloses the following technique: in the optical scanning device, where a pulse width modulation (PWM) is applied to a laser light source to express a half tone, the increase of a contrast in a distribution of potential levels in an electrostatic latent image (contrast in a distribution of exposure amounts on the photoreceptor), leads to improvement of the toner characteristic in the PWM system. The publication also describes a further technique that the contract can be improved by reducing the beam diameter measured in the scan direction (fast scan direction) to 70% or less of the size of a recording pixel (pixel density).

Actually, it is almost impossible to technically satisfy the this condition. Recently, the PWM system is frequently adopted for forming an image at a high resolution of approximately 400 to 600 spi (=number of light spots per inch (density)). To satisfy the beam-diameter condition, the beam diameter must be 45 $\mu$m or smaller for 400 spi, and it must be 30 $\mu$m for 600 spi. It is considered that because of the focal depth in the optical system, the lower limit of the beam diameter is about 50 $\mu$m for the laser beam of 780 nm in wave length, usually used, and it is about 43 $\mu$m for the laser beam of 670 nm in the visible rays region. From this fact, it is seen that the maximum value of improved resolution that can be achieved by the technique is 400 spi at most.

The Unexamined Japanese Patent Application Publication No. Hei 9-169136 discloses an image forming technique as shown also in FIG. 12. As shown, a first light beam narrow in width but high in power is modulated by an image signal; a second light beam wide in beam width but low in power is modulated by an inverted image signal; the entire scan areal range is scanned (overwritten) with the first and second light beam, whereby an image is formed. Thus, an exposure amount distribution by the first light beam is superimposed on an exposure amount distribution by the second light beam, to form a composite exposure amount distribution (composite exposure image in FIG. 12). The contrast of the composite exposure image is improved, so that an electrostatic latent image of high potential contrast is produced.

The Unexamined Japanese Patent Application Publication No. Hei 9-169136 discloses four optical systems for realizing the image forming method as shown in FIGS. 13 and 14A to 14C. A first optical system shown in FIG. 13 includes a laser light source 100 for emitting a first laser beam and another laser light source 102 for emitting a second laser beam having a beam width different from that of the first laser beam, and a beam splitter 104 for superimposing those laser beams one on the other. The optical system depicts an electrostatic latent image on a photoreceptor with the superimposed light beam. A second optical system shown in FIG. 14A includes a dual spot laser 108 with two light emitting points as light sources from which two laser beams with different beam divergence angles θ1 and θ2 are emitted (laser 108=a laser array consisting of a pair of laser light sources closely arrayed), and one collimator lens 110 which receives two laser beams from the dual spot laser 108 and makes those laser beams collimated thereby. A third optical system shown in FIG. 14B includes a dual spot laser 112 with two light emitting points from which two laser beams with equal beam spread angles are emitted, and one collimator lens 110. As shown, in this optical system, the dual spot laser 112 is disposed while being slanted with respect to the collimator lens 110. A fourth optical system shown in FIG. 14C includes a dual spot laser 112 with two light emitting points from which two laser beams with equal beam spread angles are emitted, one collimator lens 110 and an optical element 114 having a refractive index different from that of air located in one of the optical paths between the dual spot laser 112 and the collimator lens 110.

The first optical system of FIG. 13 is disadvantageous in that it is very difficult to keep the landing positions of the paired laser beams on the photoreceptor invariable irrespective of aging and ambient variations. The optical systems of FIGS. 14A to 14C are advantageous in that the relative positions of the two light emitting points are fixed, and hence that it is relatively easy to keep the landing positions of those light beams invariable. However, the second optical system of FIG. 14A is disadvantageous in that the main body of the laser 108 needs to be finely worked to make the beam spread angles of the laser beams from two light emitting points different from each other. The third optical system of FIG. 14B has the following disadvantage: it is necessary to highly accurately slant the dual spot laser 112 with respect to the collimator lens when mounting the dual spot laser, and hence much and accurate work is essential. The fourth optical system of FIG. 14C has the following disadvantage: it is necessary to highly accurately dispose the optical element 114 between the dual spot laser 112 and the collimator lens 110, and hence much and accurate work is also required.

SUMMARY OF THE INVENTION

Accordingly, an object of the present invention is to provide an optical-scanning device which is well adaptable for the formation of an image of high contrast and may be manufactured in an easy manner.

According to the present invention, there is provided a first optical scanning device comprising:

a light source for emitting a light beam;

a rotating polygon mirror for receiving a light beam from the light source, the polygon mirror having a plural number of reflecting surfaces arrayed in the rotational direction of the polygon mirror, the reflecting surfaces has some width when viewed in the rotational direction; and a scan optical system for scanning a target member with a light beam deflected by the polygon mirror.

In the optical scanning device of the invention, a light beam that is emitted from the light source is deflected by the polygon mirror having reflecting surfaces arrayed in the rotational direction, and it scans a target member through the optical scan system. If the width of the reflecting surface of the polygon mirror when viewed in the rotational direction is varied from the lower limit value to the upper limit value of a given numerical value range, which includes a value smaller than the beam diameter of the light beam incident on the polygon mirror when viewed in the rotational direction of the polygon mirror, the beam diameter of the light beam projected on the surface of the target member becomes smaller as the width of the reflecting surface is wider. Thus, the width of the reflecting surface is inversely proportional to the beam diameter of the light beam projected on the target member.

In the invention based on this fact, the reflecting surfaces of the polygon mirror has some width when viewed in the rotational direction of the polygon mirror. With this feature, when the light beam is deflected by the reflecting surface having the large width, the beam diameter of the light beam scanning the target member is small. When the light beam is deflected by the reflecting surface having small width, the beam diameter of the light beam scanning the target member is large. Therefore, if the reflecting surfaces of the polygon mirror has some width in their width when viewed in the rotational direction of the polygon mirror, the light beams having different beam diameters can be moved on the target member for scan.

When the beam diameter of the light beam projected on the target member is small, a power of light beam per unit area at the beam irradiation position is large. When the beam diameter of the light beam projected on the target member is large, a power of light beam per unit area at the beam irradiation position is small. Therefore, the optical scanning device of the present invention is suitable for forming an image of high contrast.

The plural number of reflecting surfaces of the polygon mirror are designed so that the target member is scanned with a light beam of a large beam diameter and another light beam with a small beam diameter. When the light beam from the light source is deflected by the wide reflecting surface, a light beam to be emitted from the light source is modulated by an image signal representative of an image to be formed on the target member. The modulated beam (first light beam) that is small in beam diameter and high intensity scans the target member. When the light beam from the light source is deflectedby the narrow reflecting surface, a light beam to be emitted from the light source is modulated by another image signal that is formed by inverting the image signal representative of an image to be formed on the target member. The modulated beam (second light beam) that is large in beam diameter and low intensity scans the target member. In this way, an image of high contrast is formed on the target member.

To form an image of high contrast by the technique disclosed in the Unexamined Japanese Patent Application Publication No. Hei 9-169136, it is required to minimize the displacement of the irradiation positions on the same scan line at which the light beam of small beam diameter modulated by the image signal lands and the light beam of large beam diameter modulated by the inverted image signal lands. In the invention, one polygon mirror constructed according to the invention optically processes a light beam emitted from a single light source to form a light beam of large beam diameter and a beam of small beam diameter. Therefore, the displacement of the irradiation positions of both the light beams may be suppressed to a level of a called jitter, i.e., breakage of dot arrays in the slow scan direction (approximately to less than 10 $\mu$m). Therefore, a high contrast image can be formed.

When comparing with the fine work of the light source per se, slantly mounting of the light source, inserting optical elements in small gaps, formation of the reflecting surfaces A having different widths in the rotational direction of polygon mirror is extremely easier. Therefore, the manufacturing of the optical scanning device of the invention is also easy.

Other novel and unique technical concepts of the invention will be described.

A second optical scanning device is based on the first scanning device and characterized in that the light source has (2×n) number of light emitting points arrayed in the direction intersecting the direction corresponding to the mirror rotational direction of the polygon mirror, the reflecting surfaces wide in width and the deflecting surfaces narrow in width are alternately arrayed on the polygon mirror in the rotational direction, and the target member is moved in the slow scan direction a distance corresponding to the result of multiplying a spatial interval between adjacent scan loci of the light beam on the target member by the n every time the target member is scanned with the light beam.

In case where the light source has a plural number (2×n) of light emitting points in the first scanning device, reflecting surfaces wide in width and the deflecting surfaces narrow in width are alternately arrayed on the polygon mirror in the rotational direction, and the target member is moved in the slow scan direction a distance corresponding to the result of multiplying a spatial interval between adjacent scan loci of the light beam on the target member by the n every time the target member is scanned with the light beam.

The reflecting surface of the wide width and the reflecting surface of the narrow width alternately deflect (2×n) number of light beams. The (2×n) number of light beams concurrently scan the target member through their deflection by the reflecting surface of the wide width. Then, those beams concurrently scan the target member through their deflection by the reflecting surface of the narrow width. Those scans are repeated. The target member is moved in the slow scan direction a distance corresponding to the result of multiplying a spatial interval between adjacent scan loci of the light beam on the target member by the n every time the target member is scanned with the light beam. Therefore, the scan loci of the light beams on the target member are shifted by an n number of scan loci of the light beam in the slow scan direction every scan. The entire scan areal range on the target member is scanned (overwritten) with the light beam of large beam diameter and the light beam of small beam diameter.

A third optical scanning device, which is based on the first scanning device, further comprises an incident optical system for transforming the light beams emitted from the light source into a bundle of light beams the width of which is wider than the width of each reflecting surface when viewed in the rotational direction.

In the first scanning device, the beam diameter of the light beam incident on the polygon mirror when viewed in the rotational direction may be smaller than the maximum width of the reflecting surface of the polygon mirror when viewed in the rotational direction. If so selected, a dead zone is created where the beam diameter of the light beam scanning the target member will be invariable with a variation of the width of the reflecting surface of the polygon mirror.

In this connection, the third scanning device includes an incident optical system for transforming the light beams emitted from the light source into a bundle of light beams the width of which is wider than the width of each reflecting surface when viewed in the rotational direction. Therefore, no dead zone is formed, and the beam diameter of the light beam scanning the target member is linearly varied with a variation of the width of the reflecting surface of the polygon mirror. Therefore, the beam diameter of the light beam scanning the target member may adjusted to a desired one by adjusting the width of the reflecting surface.

A fourth optical scanning device, which is based on the first scanning device, is characterized in that each reflecting surface is partially coated in the rotational direction with a reflectivity-reducing material, whereby the width of each reflecting surface is substantially reduced in the rotational direction.

The reflecting surfaces having different widths when viewed in the rotational direction of polygon mirror and arrayed in the same direction can be formed in a manner that each reflecting surface is partially coated in the rotational direction with a reflectivity-reducing material as in the fourth scanning device. The coated locations on the reflecting surface little contribute to the deflection of the incident light beam. Therefore, the substantial width of the reflecting surface in the rotational direction can be varied by varying the length of the coated portions on the reflecting surface. For this reason, a known polygon mirror the facet width of which is fixed may be applied to the polygon mirror of the fourth scanning device.

A fifth optical scanning device, based on the first scanning device, is characterized in that both ends of each reflecting surface are symmetrically coated in the rotational direction with a reflectivity-reducing material, whereby the width of each reflecting surface is substantially reduced in the rotational direction.

Where the substantial width of the reflecting surface is varied by coating the reflecting surface of the polygon mirror with a reflectivity-reducing material, the coating may be applied to only one end of the reflecting surface when viewed in the rotational direction of the polygon mirror. In this case, a variation of the substantial width of the reflecting surface (variation of the length of the coated location on the reflecting surface in the rotational direction) deviates the substantial center position on the reflecting surface. As a result, a variation pattern of power of light applied to the target member during one scan of the target member by the light beam varies. In this connection, in the fifth scanning device, both ends of each reflecting surface are symmetrically coated in the rotational direction with a reflectivity-reducing material. The variation of the substantial width of the reflecting surface little varies the substantial center position on the reflecting surface. Therefore, the fifth scanning device suppresses a variation of the variation pattern of power of light applied to the target member during one scan of the target member by the light beam.

A sixth optical scanning device, based on the first scanning device, is characterized in that the plural number of reflecting surfaces of the polygon mirror have different distances ranging to the center of rotation of the polygon mirror, whereby the reflecting surfaces are different in width when viewed in the rotational direction.

The reflecting surfaces having different widths when viewed in the rotational direction of polygon mirror and arrayed in the same direction can be formed by forming the polygon mirror so that the plural number of reflecting surfaces of the polygon mirror have different distances ranging to the center of rotation of the polygon mirror as in the sixth scanning device. In this case, the known polygon mirror the facet width of which is fixed cannot be used, but no coating step is not required. Therefore, the manufacturing of the polygon mirror of the invention is easy.

A seventh optical scanning device, based on the sixth scanning device, is characterized in that the scan optical system function as a reduction optical system in the slow scan direction.

In the sixth scanning device, the plural number of reflecting surfaces of the polygon mirror have different distances ranging to the center of rotation of the polygon mirror. Therefore, in case where a light source has a plural number of light emitting points arrayed in the direction substantially orthogonal to the deflection direction of the laser beam by the polygon mirror, and a plural number of light beams emitted from those light emitting spots are reflected by the same reflecting surface and concurrently scan the target member, the spatial intervals among the plural number of light beams in the slow scan direction (substantially orthogonal to the scan direction) on the target member are different every reflecting surface.

In the seventh optical scanning device, the scan optical system for scanning the target member with the light beam by deflecting the light beam by use of the polygon mirror functions as a reduction optical system in the slow scan direction. Therefore, a variation of the intervals of the light beams in the slow scan direction on the target member (distance between the irradiation positions of the light beams) may be reduced.

An eighth optical scanning device, based on the second scanning device, further comprises:

storage means capable of storing at least n lines of image data representative of an image to be formed on the target member;

input means for sequentially inputting the image data every data unit consisting of n lines; and control means for repeating the following operations:
1) every time image data of n lines is input by the input means, the control means reads out image data of n lines from the storage means,
2) when a light beam is deflected by any of the reflecting surfaces wide in width (when viewed in the rotational direction), the control means causes a modulation of 2n number of light beams emitted from the light source by the input image data of n lines and the readout image data of n lines, and
3) when a light beam is deflected by any of the reflecting surfaces narrow in width (when viewed in the rotational direction), the control means a) inverts the light source by the input image data of a lines and the readout image data of n lines, b) causes a modulation of 2n number of light beams emitted from the light source by the inverted input image data of n lines and the inverted readout image data of n lines, and c) stores the input image data of n lines into the storage means.

A high contrast image may be formed on the target member in a manner that when the light beam emitted from the light source is deflected by the reflecting surface of wide width, the image signal (image data) is modulated by the light beam emitted from the light source, when the light beam is deflected by the reflecting surface of narrow width, the light beam is modulated by the inverted image signal (inverted image data), and both the light beams are moved on the target member for scan (overwrite) In the second scanning device, some way of storing the image data and the inverted image data needs a memory of large memory capacity.

To cope with this, as in the eighth optical scanning device, input means is provided for sequentially inputting the image data every data unit consisting of n lines, and control means for repeating the following operations:

1) every time image data of n lines is input by the input means, the control means reads out image data of n lines from the storage means,
2) when a light beam is deflected by any of the reflecting surfaces wide in width (when viewed in the rotational direction), the control means causes a modulation of 2n number of light beams emitted from the light source by the input image data of n lines and the readout image data of n lines, and
3) when a light beam is deflected by any of the reflecting surfaces narrow in width (when viewed in the rotational direction), the control means a) inverts the light source by the input image data of n lines and the readout image data of n lines, b) causes a modulation of 2n number of light beams emitted from the light source by the inverted input image data of n lines and the inverted readout image data of n lines, and c) stores the input image data of n lines into the storage means.

With this, there is no need of using storage means for storing image data of one frame, and another storage means for storing the inverted image data of one frame. The required memory capacity of the storage means for storing data is reduced.

A ninth optical scanning device, based on the first scanning device, is characterized in that the light source has a pair of light emitting points arrayed in the direction intersecting the direction corresponding to the mirror rotational direction of the polygon mirror, the reflecting surfaces wide in width and the deflecting surfaces narrow in width are alternately arrayed every group of m number of reflecting surfaces on the polygon mirror in the rotational direction, the scan optical system is arranged such that two light beams deflected by the polygon mirror land on the target member at positions spaced from each other in the slow scan direction a distance corresponding to the result of multiplying a spatial interval between adjacent scan loci of the light beam by the m, and the target member is moved in the slow scan direction a distance corresponding to a spatial interval between adjacent scan loci of the light beam on the target member every time the target member is scanned with the light beam.

When the light source has a pair (two) of light emitting points in the first scanning device, the scanning device may be arranged like the ninth optical scanning device: the plural number of reflecting surfaces of the polygon mirror are arrayed such that the reflecting surfaces wide in width and the deflecting surfaces narrow in width are alternately arrayed every group of m number of reflecting surfaces on the polygon mirror in the rotational direction; The scan optical system is arranged such that two light beams deflected by the polygon mirror land on the target member at positions spaced from each other in the slow scan direction a distance corresponding to the result of multiplying a spatial interval between adjacent scan loci of the light beam by the m; and The target member is moved in the slow scan direction a distance corresponding to a spatial interval between adjacent scan loci of the light beam on the target-member every time the target member is scanned with the light beam.

With such an arrangement, two light beams emitted from the paired light emitting points are moved for scan m times by the reflecting surface of wide width, and then moved for scan by the reflecting surface of narrow width. These successive operations are repeated. The two light beams that are deflected by the polygon mirror land on the target member at positions spaced from each other in the slow scan direction a distance corresponding to the result of multiplying a spatial interval between adjacent scan loci of the light beam by the m. The target member is moved in the slow scan direction a distance corresponding to a spatial interval between adjacent scan loci of the light beam on the target member every time the target member is scanned with the light beam. Therefore, the two light beams are moved m times for scan by the reflecting surfaces having equal widths; an areal range of 2m number of scan loci of the light beams is scanned with the two light beams; and during this, the target member is moved in the slow scan direction by the m number of scan loci of the light beams. The entire scan areal range on the target member is scanned (overwritten) with the light beam of large beam diameter and the light beam of small beam diameter.

In the ninth optical scanning device, the two light beams land on the target member at positions spaced from each other in the slow scan direction a distance corresponding to the result of multiplying a spatial interval between adjacent scan loci of the light beam by them. Even when the distance between the paired light emitting points is relatively large, there is no need of taking a measure such that the beam diameter of the laser beam incident on the surface of the photoreceptor 12 when viewed in the slow scan direction is increased by setting the magnification of the optical system in the slow scan direction at a small value of magnification to reduce the interval between the irradiation positions of the laser beams, and by reducing the beam width of the laser beam by use of a slit located in the optical path of the laser beam. Hence, the energy of the laser beam can efficiently be utilized.

A tenth optical scanning device, based on the first scanning device, further comprises: a detector so disposed as to receive the light beam when the light beam is deflected to a scan start end by the polygon mirror; and a modulation control portion for judging the width of the reflecting surface which reflects the light beam on the basis of an amount of light detected by the detector when the detector receives the light beam, and for controlling a modulation of the light beam in accordance with the determined width.

In the first scanning device, to modulate the light beam, it is necessary to detect the width of the reflecting surface now reflecting the light beam. This can be achieved by using various sensors. A preferable width detection is performed, as in the tenth optical scanning device: when a light beam is incident on a detector so disposed as to receive the light beam when the light beam is deflected to a scan start end by the polygon mirror; and the width of the reflecting surface which reflects the light beam is judged on the basis of an amount of light detected by the detector when the detector receives the light beam, and a modulation of the light beam is controlled in accordance with the determined width. The detector may be an SOS sensor usually used for detecting the modulation start. Therefore, the tenth optical scanning device can detect the width of the reflecting surface without any additional means.

BRIEF DESCRIPTION OF THE DRAWINGS

FIGS. 3A and 3B show optical schemes of the optical scanning device of FIG. 2.

DETAILED DESCRIPTION OF THE PREFERRED EMBODIMENTS

The preferred Embodiments of the present invention will be described in detail with reference to the accompanying drawings.

<First Embodiment>

Figure 1:
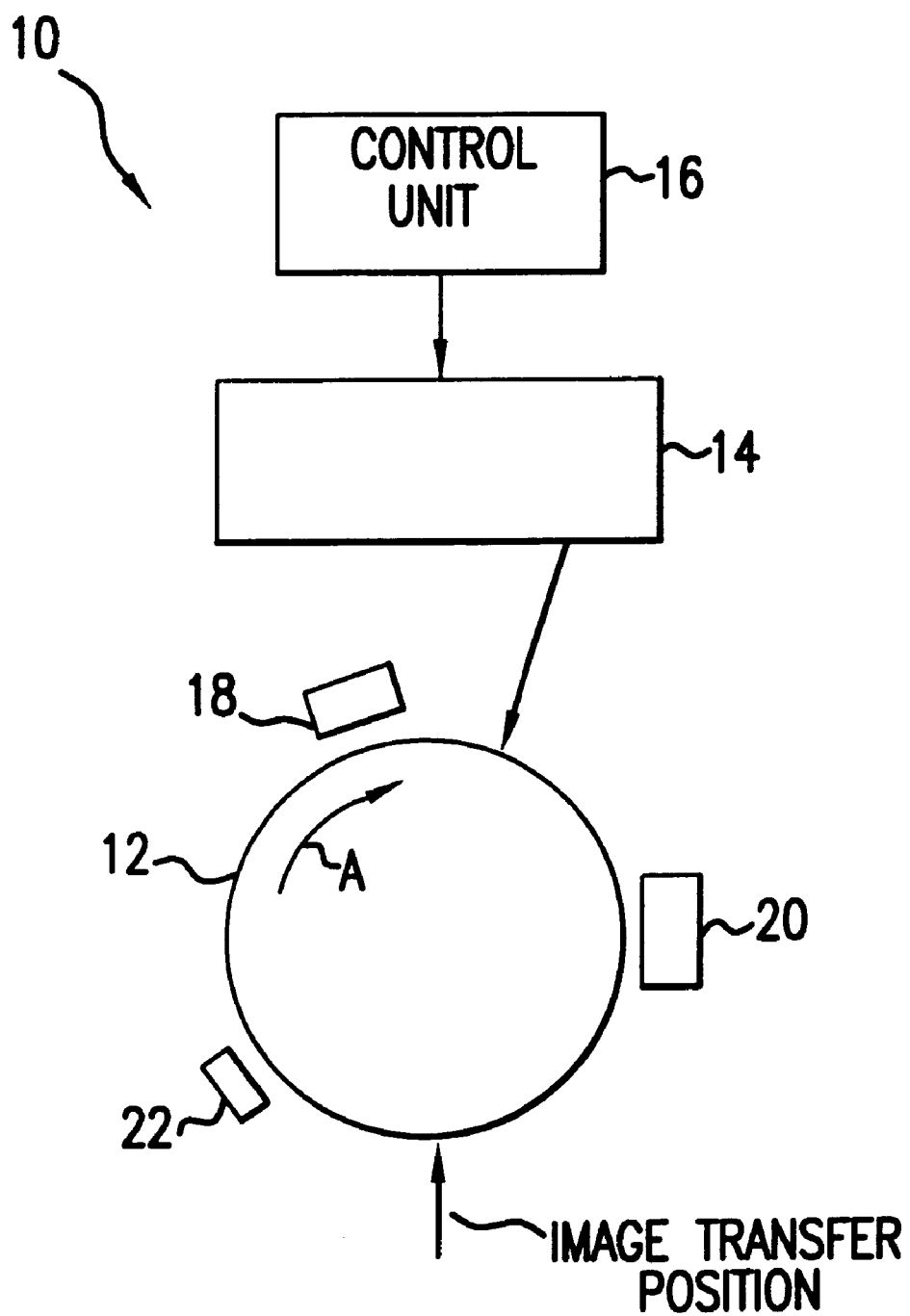
FIG. 1 is a diagram, in block and schematic form, showing an arrangement of an image forming apparatus incorporating the present invention thereinto.

Referring to FIG. 1, there is shown an image forming apparatus 10 which is an embodiment of the present invention. The image forming apparatus 10 is made up of a light sensitive drum 12 (referred to as a photoreceptor) an optical scanning device 14, and a control unit 16. In the specification, an object to be irradiated with light beams for latent image formation (referred to as a target member) takes the form of the photoreceptor 12. The optical scanning device 14 projects laser beams onto the surface of the photoreceptor 12 in a scanning manner. The control unit 16 contains a CPU, and controls the operation of the overall image forming apparatus 10, and modulates the laser beams that are emitted from the optical scanning device 14 by the data of an image to be formed.

A charger 18 for charging the surface of the photoreceptor 12 is disposed above the photoreceptor 12. A laser beam that is emitted from the optical scanning device 14 is projected onto the photoreceptor 12 at an exposure position located downstream of the charger 18 when viewed in the rotational direction (direction A in FIG. 1) of the photoreceptor 12. A laser beam is projected on the surface (charged by the charger 18) of the photoreceptor 12 at the exposure position to form an electrostatic latent image therein. A developing unit 20 is disposed downstream of the exposure position in the rotational direction of the photoreceptor 12. The developing unit 20 supplies toner particles onto an area having the latent image formed therein on the surface of the photoreceptor 12, to thereby form a toner image on the surface of the photoreceptor 12.

A position right under the photoreceptor 12 is an image transfer position. At the image transfer position, the toner image is transferred from the photoreceptor 12 onto a transfer belt or a transfer member (not shown). In other words, an image is formed on the transfer belt or member. A cleaner 22 is located downstream of the exposure position in the rotational direction of the photoreceptor 12. The cleaner 22 removes toner particles left on the surface of the photoreceptor 12 after the transferring of the image (toner image).

Figure 2:
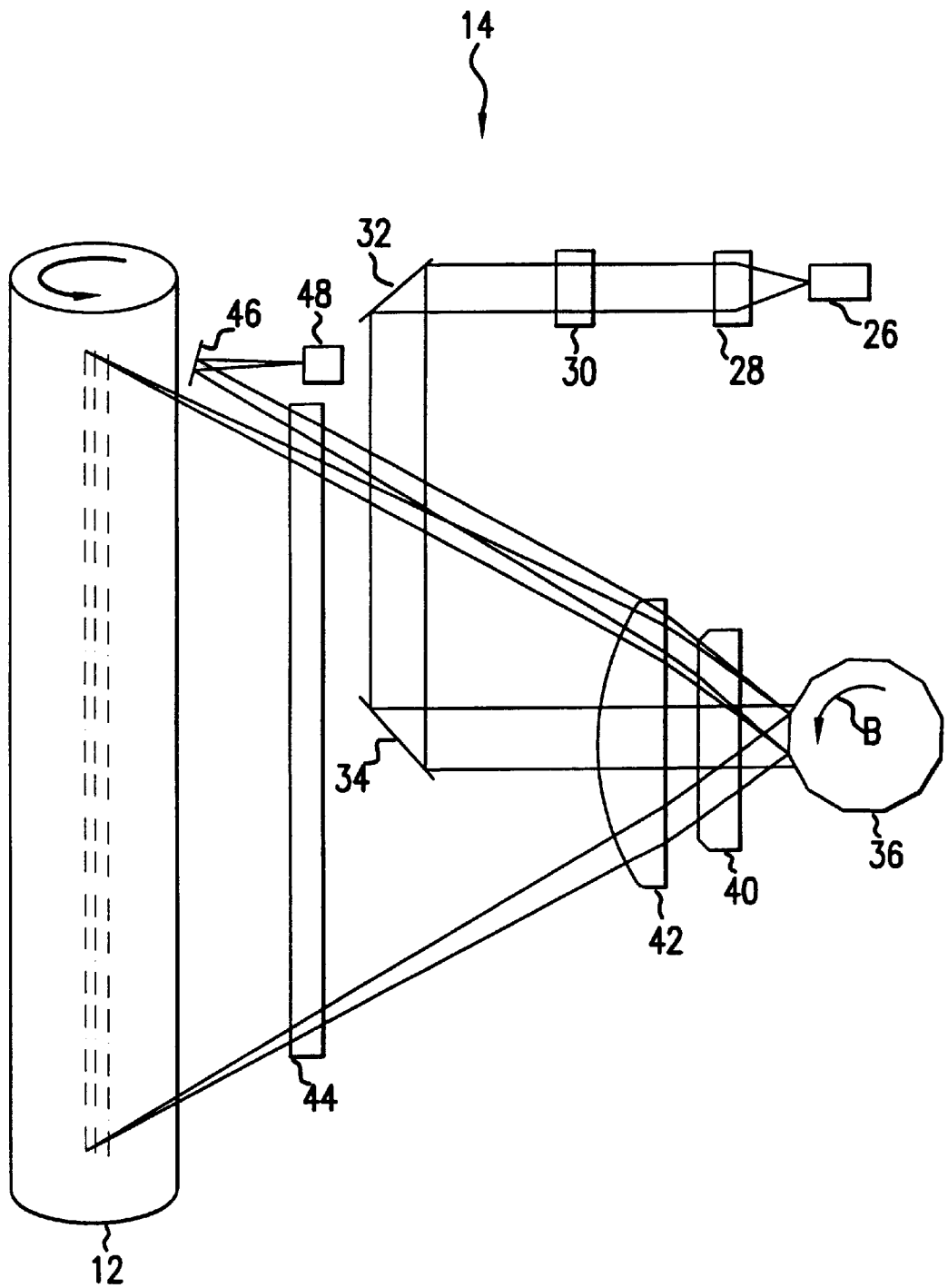
FIG. 2 is a plan view schematically showing an optical scanning device used in the FIG. 1 apparatus.

The optical scanning device 14 will be described. As shown in FIGS. 2 and 3, the optical scanning device 14 includes a laser diode (LD) 26 as a light source in the present invention. The LD 26 in the present embodiment is a dual spot laser diode (FIG. 3B) with two light emitting points A and B (FIG. 3B) from which laser beams are emitted. In the description to follow, a laser beam emitted from the light emitting point A is called a "laser beam A", and a laser beam from the light emitting point B is called a "laser beam B".

A collimator lens 28, a cylindrical lens 30, and plane mirrors 32 and 34 are arranged in this order on the laser beam emitting side of the LD 26 (plane mirrors 32 and 34 are omitted in FIG. 3). A polygon mirror 36 of a regular N (N: even number) prism having a number of reflecting surfaces (referred to often as facets) on the outer periphery thereof is disposed on the laser beam emitting side of the plane mirror 34. The polygon mirror 36 is rotated in the direction B of an arrow by a scanner motor not shown.

The combination of the collimator lens 28 and the cylindrical lens 30 corresponds to an optical system. Two laser beams emitted from the LD 26 are collimated, by he collimator lens 28, into a bundle of parallel light beams, the width of which is wider than the width of each reflecting surface of the polygon mirror 36 in the rotational direction of the polygon mirror 36. The light beams are then focused, in the form of a linear optical image (extending in the main scan direction), on the reflecting surface of the polygon mirror 36 by the cylindrical lens 30 having power thereof in only the slow scan direction substantially orthogonal to the direction in which the polygon mirror 36 deflects the light beams (this optical system constitutes a called overfilled optical system).

fθ lenses 40, 42 and a collimator lens 44 having power thereof in only the slow scan direction are disposed in the this order on the laser beam emitting side of the polygon mirror 36. The arrangement of those optical elements 40, 42 and 44 corresponds to a scan optical system handled in the present invention. The two laser beams that are deflected in a given direction through the reflection on the reflecting surface or facet of the polygon mirror 36 pass through the fθ lenses 40, 42 and the collimator lens 44, and are emitted out of the optical scanning device 14 through optical elements, e.g., plane mirrors, (not shown), and projected onto the surface of the photoreceptor 12. The laser beams scan (fast or main scan) the outer peripheral surface of the photoreceptor 12 in the direction parallel to the axis of the photoreceptor 12, with the rotation of the polygon mirror 36. The slow or vertical scan by the light beams is carried out through the rotation of the polygon mirror 36.

The collimator lens 44 is designed such that the light emitting points A and B of the LD 26 are arrayed in the direction substantially orthogonal to the deflection direction of the laser beam by the polygon mirror 36 (FIG. 3B). In the first embodiment, the collimator lens 44 is designed so that the laser beams A and B emitted from the light emitting points A and B land at positions separated from each other in the vertical scan direction a distance between adjacent lines (linear dot arrays extending in the main scan direction) of an image to be formed on the outer peripheral surface of the photoreceptor 12. When the polygon mirror 36 is turned at an angle corresponding to a one complete scan of the laser beam, an exposure of two adjacent lines of the image is performed on the surface of the photoreceptor 12.

Figure 4A:
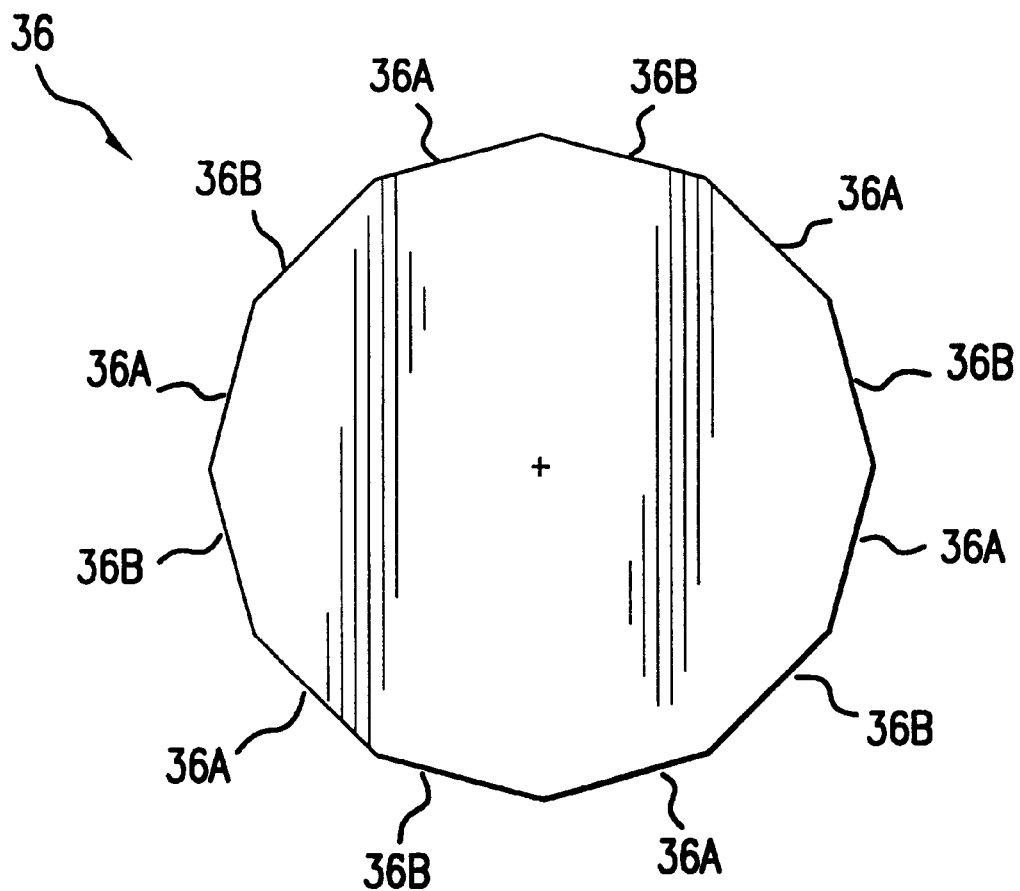
FIGS. 4A and 4B are a plan view and a side view showing a polygon mirror which is a first embodiment of the invention.
Figure 4B:
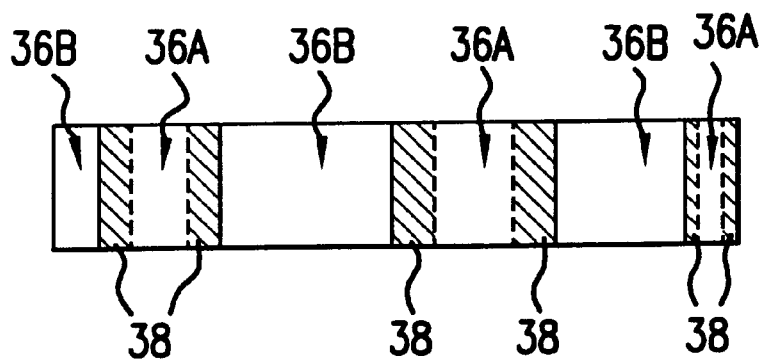

In the array of the reflecting surfaces arranged on the outer periphery thereof in the rotational direction of the polygon mirror, the reflecting surface having coatings 38 to reduce reflectivity thereof appear every other reflecting surface (FIG. 4B). The coatings 38 are located at both ends of the reflecting surface (when viewed in the rotational direction of the polygon mirror) while being symmetrical with respect to the center line of the reflecting surface. (In FIG. 4, the reflecting surfaces having the coatings 38 ("coating facet") are designated by reference numeral 36A, and the reflecting surfaces having no coating ("non-coating facet") are designated by numeral 36B.) Each reflecting surface having the coatings 38, i.e., coating facet 36A, little reflects light. Therefore, the reflecting width on the coating facet 36A is smaller than that on the non-coating facet 36B.

The polygon mirror 36 corresponds to a polygon mirror referred to in aspect 4 (specifically, a polygon mirror in aspect 5 and that in aspect 2). A material suitable for the coating 38 is such that reflectivity thereof is insensitive (or a little sensitive) to a variation of angle of the reflecting surface, and strong enough to bear the windage loss of the polygon mirror 36 rotating at high speed. A preferable material is an absorption type coating used for an ND filter, for example.

When the laser beam emitted from the LD 26 is deflected by the coating facet 36A of the polygon mirror 36, the F number of the optical system is larger than that when it is deflected by the non-coating facet 36B. The beam diameter of the laser beam (referred to "radiation beam diameter") on the photoreceptor 12 in the main scan direction when the laser beam is deflected by the coating facet 36A is larger than that when it is deflected by the non-coating facet 36B. Further, a power of light per unit area (illuminance on the photoreceptor 12) is smaller than in the latter case.

As described above, in the array of reflecting surfaces of the polygon mirror 36, the coating facet 36A appears every other facet in the rotational direction of the polygon mirror 36 (FIG. 4). The irradiation beam diameters of the two laser beams emitted from the LD 26 are varied every one complete scan.

The width of each reflecting surface when viewed in the rotational direction of the polygon mirror is determined by a focal distance of each fθ lens and the irradiation beam diameter. As will be described later, when the laser beam is deflected by the non-coating facet 36B (the laser beam is referred to as an "image data basis beam"), it is modulated by image data (referred to as a "bias data basis beam"). When it is deflected by the coating facet 36A, it is modulated by bias data (the inverted image data). In this case, the irradiation beam diameter of the laser beam when it is modulated by the bias data is preferably two times as large as that when it is modulated by the image data.

To form an electrostatic latent image of high contrast, the irradiation beam diameter of the bias date basis beam is selected to be preferably about two times as large as that of the image data basis beam.

In case where a fθ lens having a focal length of about 320 mm is used for each of the fθ lenses 40 and 42, the irradiation beam diameter of the image data basis beam is 50 μm, and that of the bias data basis beam is 100 μm, the width of the non-coating facet 36B for deflecting image data basis beam is 7.5 mm and the width of the coating facet 36A for deflecting the bias data basis beam is 3.8 mm. From this, it is seen that the coatings 38 at both ends of each coating facet 36A are each 1.9 mm wide.

A return mirror 46 is located at a position corresponding to the start of scan (SOS) in the full scan range of the laser beam on the laser beam emission side of the collimator lens 44. The laser beam that is reflected by the return mirror 46 is incident on an SOS sensor 48. The laser beam that is emitted from the LD 26 is incident on the SOS sensor 48 by way of the return mirror 46 when the facet of the polygon mirror 36 which is reflecting the laser beam is turned to the SOS.

Figure 5:
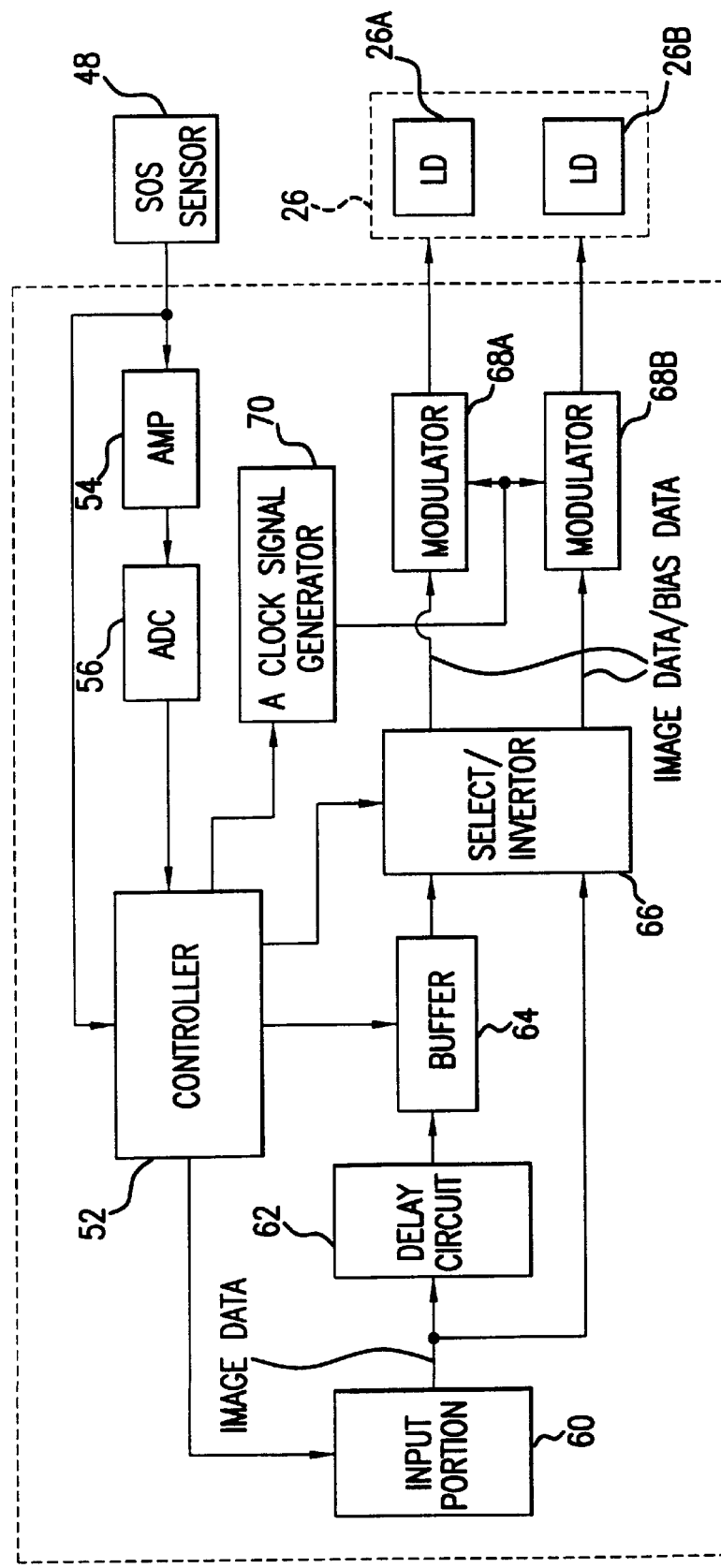
FIG. 5 is a block diagram showing a control unit of the image forming apparatus of FIG. 1.

The control unit 16 will next be described. A portion of the control unit 16, which is for controlling the optical scanning device 14, is illustrated in FIG. 5. The SOS sensor 48 is directly connected to a controller 52; a signal output from the SOS sensor 48 is directly connected to the controller 52. The controller 52 recognizes the timing of starting a modulation of the laser beam by the signal from the SOS sensor 48.

The SOS sensor 48 is-connected to the controller 52 by way of an amplifier 54 and an analog to digital converter (ADC) 56. The data that is input to the controller 52 through the amplifier 54 and the ADC 56 represents a power of light of the laser beam incident on the SOS sensor 48. The controller 52 compares the received data with a preset value to judge whether or not the reflecting surface of the polygon mirror 36 which is currently reflecting the laser beam is the coating facet 36A or the non-coating facet 36B.

The control unit 16 includes an input portion 60. The output terminal of the input portion 60 is connected to the input terminals of a delay circuit 62 and a select/invertor 66. The input portion 60 includes an image memory (storage means) not shown. The input portion 60 stores image data that is gathered through the scanning by a document reader (not shown) contained in the image forming apparatus 10 or image data transferred from an external image processing apparatus, e.g., a computer, into the image memory; reads out the image data from the image memory every data unit of one line in accordance with an instruction from the controller 52; and inputs the readout image data into the delay circuit 62 and the select/invertor 66. The input portion 60 corresponds to input means used in aspect 9.

A buffer 64 (storage means in aspect 9) capable of storing the image data of one line is connected to the output terminal of the select/invertor 66. The image data from the input portion 60 is delayed by a given time by the delay circuit 62, and then input to the buffer 64. The buffer 64 is connected to the controller 52 and the select/invertor 66, and responds to an instruction from the controller 52 to output the input data or the stored data to the select/invertor 66.

Modulators 68A and 68B are coupled to the select/invertor 66. The select/invertor 66, connected to the controller 52, responds to an instruction from the controller 52 to directly transfer the image data from the buffer 64 into the modulator 68A or to transfer the image data that is inverted as bias data (inverted image data) to the modulator 68A; and responds to an instruction from the controller 52 to directly transfer the data from the input portion 60 to the modulator 68B or to transfer the inverted image data as bias data to the modulator 68B.

The modulators 68A and 68B are connected for reception to a clock signal generator 70, and the generator 70 is connected for reception to the controller 52. The clock signal generator 70 responds to an instruction from the controller 52 and outputs a clock signal at a fixed frequency to the modulators 68A and 68B. In synchronism with a clock signal received from the clock signal generator 70, the modulators 68A and 68B convert the data received from the select/invertor 66 into digital data signal and generate modulation signals for pulse-width modulating laser beams to be emitted from the LD 26 in accordance with signal levels of the converted data signal.

The modulators 68A end 68B are connected to the LD 26. Of the two laser beams A and B that are emitted from the LD 26, the laser beam A is modulated by a modulation signal output from the modulator 68A, and the laser beamB is modulated by a modulation signal from the modulator 68B. In FIG. 5, the LD26 is illustrated as a laser diode consisting of two LDs 26A and 26B for ease of explanation.

An operation of the first embodiment will be described. To form an image, the control unit 16 operates the charger 18, the optical scanning device 14, the developing unit 20 and the cleaner 22, and rotates the photoreceptor 12. The controller 52 of the control unit 16 executes an exposure control process shown in FIG. 6, to thereby modulate laser beams that are emitted from the LD 26 by signals representative of an image to be formed. A rotational speed of the photoreceptor 12 is so selected that the peripheral surface of the photoreceptor 12 is moved in the vertical scan direction a distance (movement distance in aspect 2, in the case of n=1) corresponding to a spatial interval between the adjacent lines of the image to be formed during one scan period of the laser beam in the optical scanning device 14.

Figure 6B:
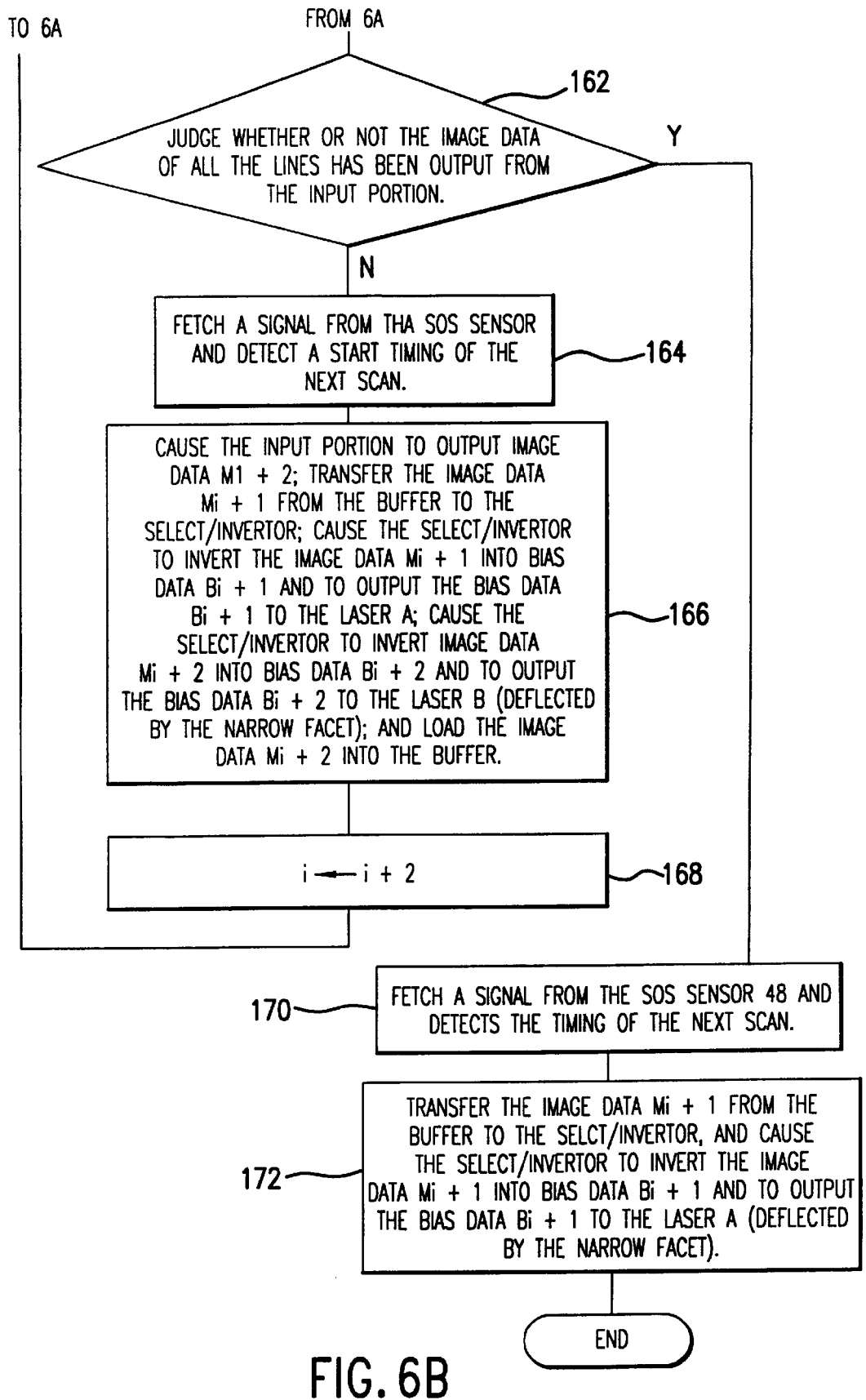
FIG. 6 is a flow chart showing an exposure control process used in the first embodiment.

The exposure control process to be executed by the controller 52 will be described with reference to FIG. 6 showing a flow chart of the process. To begin with, the controller 52 executes a step 150: a variable i is set to "1". The controller then executes a step 152: the controller 52 fetches a signal from the SOS sensor 48 and data through the amplifier 54 and the ADC 56 from the SOS sensor 48. The controller executes a step 156: the controller judge whether or not a time that the narrow facet (coating facet 36A) of the polygon mirror 36 starts reflection (deflection) thereof of the laser beams emitted from the LD 26 is reached. To make the judgement, the controller detects a time that the laser beam is incident on the SOS sensor 48 on the basis of a level variation of the signal directly applied thereto, and compares a value of data (optical power of laser beam incident on the SOS sensor 48) received through the amplifier 54 and the ADC 56 from the SOS sensor 48 with a predetermined value during a period that the light beam is incident on the SOS sensor 48. If the data value is above the predetermined value, the reflecting surface is reflecting the laser beams is the non-coating facet 36B (wider facet). Therefore, the answer is NO, and hence the controller returns to the step 152 and advances to the step 154. If the data value is equal to or smaller than the predetermined value, the currently beam reflecting surface is the coating facet 36A (narrow facet). The answer is YES, and the controller advances to the next step 156.

The judgement of the step 154 corresponds to the judgement on the width of the reflecting surface by the modulation control portion in aspect 11.

In the step 156, the controller causes the input portion 60 to output the image data of the i-th line (at this time, i=1), and controls the select/invertor 66 such that it inverts the image data Mi that is output from the input portion 60 into bias data Bi and outputs the bias data Bi to the buffer 64 for storage thereof. Further, the controller drives the LD 26 by a drive current of relatively low level.

Figure 7:
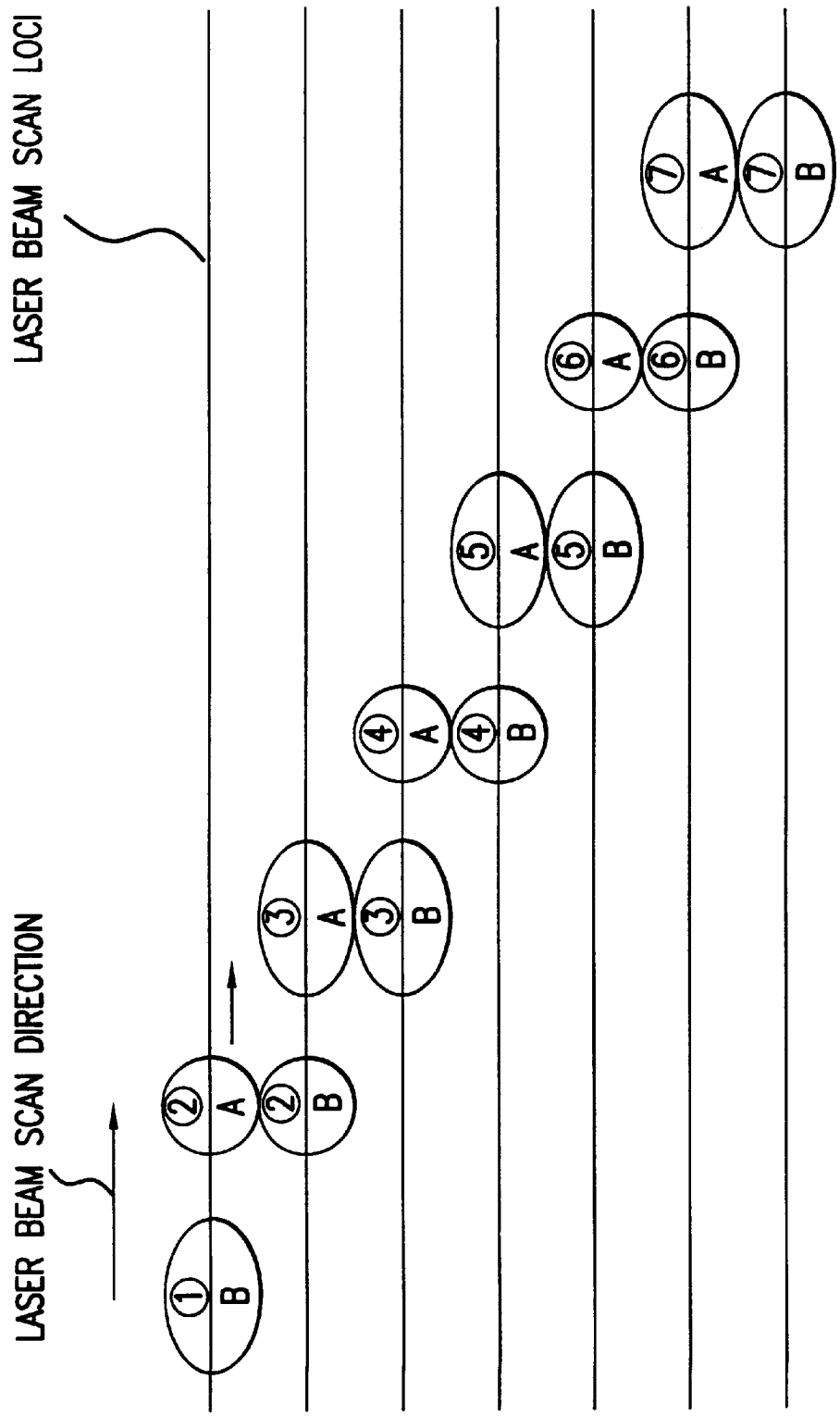
FIG. 7 is a sequence diagram showing a sequence of scan by use of two laser beams in the first embodiment.

Therefore, in the LD 26, only the light emitting point B emits a laser beam B modulated by the bias data Bi. The laser beam B is deflected by the coating facet 36A of the polygon mirror 36 to scan the surface of the photoreceptor 12 one time. In this case, the laser beam B takes the form of a light spot (denoted as B+(1)) of which the spot diameter is relatively large in the main scan direction and a power of light is small (the light power is high enough to keep the photoreceptor 12 at a potential above a developing potential even if it receives the laser beams) (FIG. 7).

In a step 158, the controller fetches a signal from the SOS sensor 48, and detects a time that the next scan starts, and advances to the next step 160. As recalled, in the first embodiment, the coating facets 36A and the non-coating facets 36B of the polygon mirror 36 are alternately arrayed in the rotational direction of the polygon mirror. Therefore, in the next scan, the laser beams A and B are deflected by the non-coating facet 36B.

In a step 160, the controller causes the input portion 60 to output the image data Mi+1 of the (i+1)-th line (at this time, i=2) and causes the buffer 64 to output the image data Mi of the i-th line stored therein to the select/invertor 66. Further, the controller controls the select/invertor 66 so that it directs the image data Mi that is output from the buffer 64 to the modulator 68A, and directs the image data Mi+1 that is output from the input portion 60 to the modulator 68B, and stores the input image data Mi+1 into the buffer 64 through the buffer 64. Furthermore, the controller drives the LD 26 by a drive current of relatively high level.

As a result, the light emitting point A of the LD 26 emits a laser beam A modulated by the image data Mi, and the light emitting point B emits a laser beam B modulated by the image data Mi+1. The laser beams A and B are deflected by the non-coating facet 36B of the polygon mirror 36 to scan the surface of the photoreceptor 12 one time. In this case, the laser beams A and B take the form of light spots (denoted as A+(2) and B+(2)) of which the spot diameters are relatively large in the main scan direction and power of light are large (the light power are high enough to completely discharge the portion on the photoreceptor 12 where is exposed to the laser beams) (FIG. 7).

The photoreceptor 12 is rotated at such a rotational speed that the peripheral surface of the photoreceptor 12 is moved in the vertical scan direction a distance of a spatial interval between the adjacent lines of the image to be formed during one scan period of the laser beam. A range (within which the light spot A moves) to be scanned with the laser beam A (modulated by the image data Mi) on the photoreceptor 12 in the present scan is coincident with a range to be scanned with the laser beam B (modulated by the bias data Bi as the inverted image data Mi) on the surface of the photoreceptor 12 in the preceding scan.

In the next step 162, the controller judges whether or not the image data of all the lines has been output from the input portion 60. If the answer is NO, the controller proceeds to a step 164. In this step, the controller fetches a signal from the SOS sensor 48 and detects a start timing of the next scan, and goes to a step 166.

In the next scan, the laser beams A and B are deflected by the coating facet 36A. Therefore, in the step 166, the controller causes the input portion 60 to output image data M1+2 of the (i+2)th line (at this time, the third line), and causes the buffer 64 to output the image data Mi+1 of the (i+1)th line to the select/invertor 66. Under control by the controller, the select/invertor 66 inverts the image data Mi+1 output from the buffer 64 into bias data Bi+1, and outputs it to the modulator 68A, and further inverts image data Mi+2 into bias data Bi+2, and outputs it to the modulator 68B. Further, the controller loads the image data Mi+2 into the buffer 64. The controller also drives the LD 26 by a drive current of relatively low level.

As a result, the light emitting point A of the LD 26 emits a laser beam A modulated by the bias data Bi+1, and the light emitting point B emits a laser beam B modulated by the bias data Bi+2. The laser beams A and B are deflected by the coating facet 36A of the polygon mirror 36 to scan the surface of the photoreceptor 12 one time. In this case, the laser beams A and B take the form of light spots (denoted as A+(3) and B+(3)) of which the spot diameters are relatively small in the main scan direction and powers of light are large (the light powers are low (FIG. 7).

A range (within which the light spot Amoves) to be scanned with the laser beam A (modulated by the bias data Bi+1 as the inverted image data Mi+1 of the (i+1) th line) in the present scan is coincident with a range to be scanned with the laser beam B (modulated by the image data Mi+1) on the surface of the photoreceptor 12 in the preceding scan. In a step 168, the controller adds "2" to the variable i and returns to the step 158, and repeats the execution of the steps 158 to 168 till the answer to the step 162 is YES. Therefore, the scans by the laser beams A and B with the light spots A+(4) and B+(4), A+(5) and B+(4), and so on are performed sequentially. The entire exposure areal range by laser beam on the photoreceptor 12 is exposed to the laser beams modulated by the image data and the laser beam modulated by the bias data (as the inverted image data). As a result, an electrostatic latent image of high contrast is formed in the surface of the photoreceptor 12. Incidentally, the steps 158 to 168 correspond to control means in aspect 9.

If the answer to the step 162 is YES, the controller advances to a step 170. In this step, the controller fetches a signal from the SOS sensor 48 and detects a start timing of the next scan, and then advances to a step 172. In this step, the image dataMi+1 of the (i+1) th line (final line of the image) stored in the buffer 64 is output from the buffer 64 to the select/invertor 66. The select/invertor 66 then inverts the image data Mi+1 into bias data Bi+1. The converted one is output to the modulator 68A. The controller also drives the LD 26 by a drive current of relatively low level.

As a result, the light emitting point A of the LD 26 emits a laser beam A modulated by the bias data Bi+1 (as the inverted image data Mi+1 of the last line), and the laser beam A is deflected by the coating facet 36A of the polygon mirror 36 and scans the same scan range as by the laser beam B (modulated by the image data Mi+1 of the last line) on the photoreceptor 12.

While in the first embodiment, the LD 26 includes two light emitting points (light source when n=1 in aspect 2), the light source may have (2×n (n≧2) number of light emitting points.

Also in this case, 1) when the buffer 64 is designed to have a memory capacity capable of storing image data of n lines; the input portion 60 is designed such that image data is input thereto every data unit of n lines; the photoreceptor 12 is rotated such that the peripheral surface of the photoreceptor 12 is moved a distance of line interval (of the image)×n in the vertical scan direction during one scan cycle of the laser beam; the controller 52 reads out image data of n lines from the buffer 64 every time the input portion 60 outputs image data of n lines; and the laser beam is deflected by the non-coating -facet 36B of the polygon mirror 36;

2) when two laser beams to be emitted from the LD 26 are modulated by the input image data of n lines and the readout image data of n lines; the laser beams are deflected by the coating facet 36A of the polygon mirror 36; the input image data of n lines and the readout image data of n lines are inverted; 2n number of laser beams to be emitted from the LD 26 are modulated by bias data (inverted image data) of 2n number of lines; the input image data of n lines is stored into the buffer 64.

Figure 8:
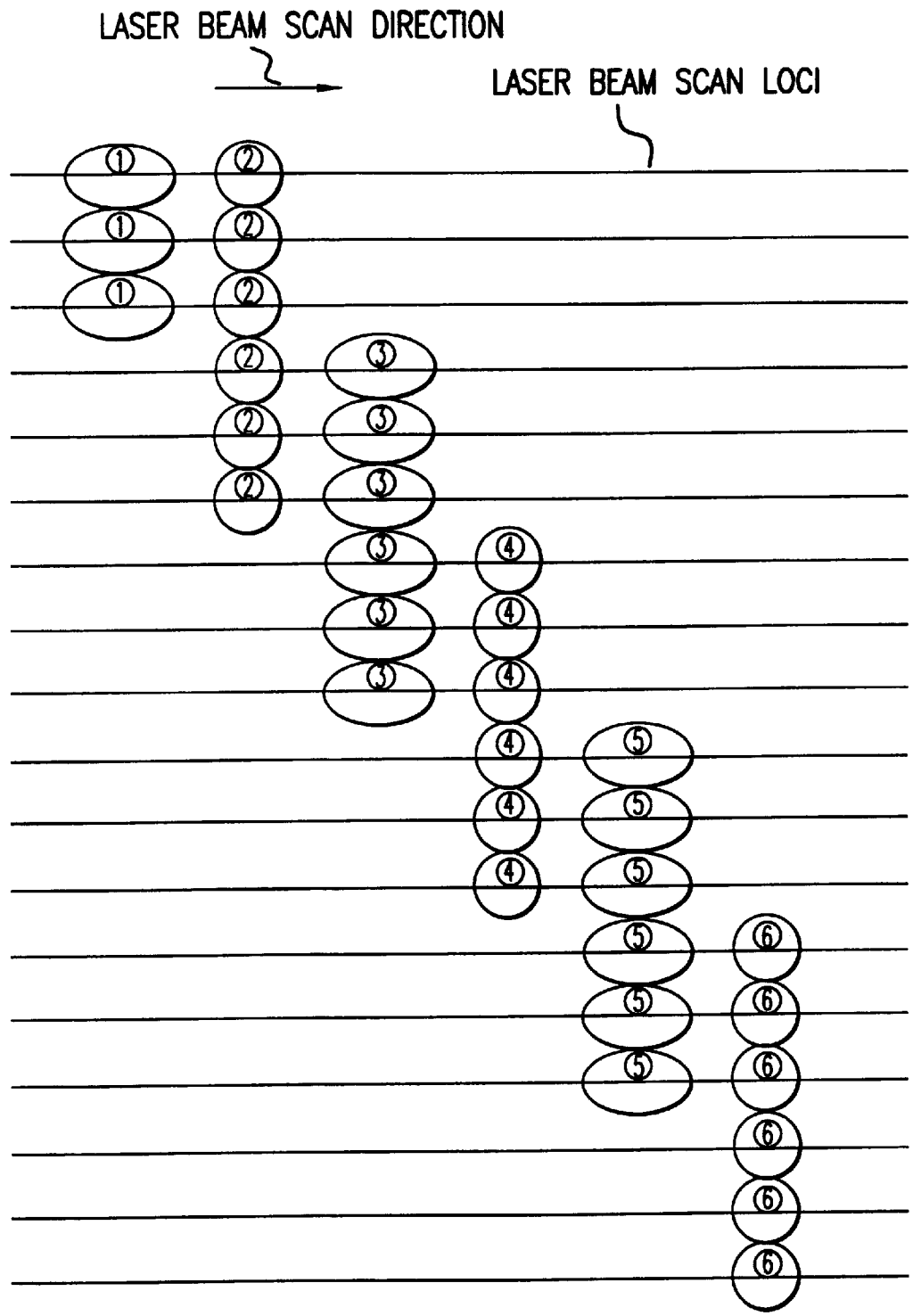
FIG. 8 is another sequence diagram showing a sequence of scan by use of six laser beams.

With such an arrangement, as shown in FIG. 8, (2×n) number of light spots are formed on the surface of the photoreceptor 12 by projecting (2×n) number of laser beams (emitted from (2×n) number of light emitting points as a light source) onto the surface of the photoreceptor 12. Those light spots, which are relatively small in the spot diameter when viewed in the main scan direction and large in the light power, and those light spots, which are relatively large in the spot diameter when viewed in the main scan direction and small in the light power, are alternately formed every scan cycle (a scan sequence shown in FIG. 8 is produced when six (n=3 light emitting points are used). The (2×n) number of laser beams are modulated by the bias data when those beams are deflected by the coating facet 36A, and are modulated by the image data when the laser beams are deflected by the non-coating facet 36B. The surface of the photoreceptor 12 is scanned with those laser beams. Therefore, an electrostatic latent image formed on the surface of the photoreceptor 12 has a high contract.

<Second Embodiment>

A second embodiment of the present invention will be described. Like or equivalent portions are designated by like reference numerals used in the first embodiment. The second embodiment will be described placing emphasis on only portions different from those or not found-in the first embodiment.

Figure 9A:
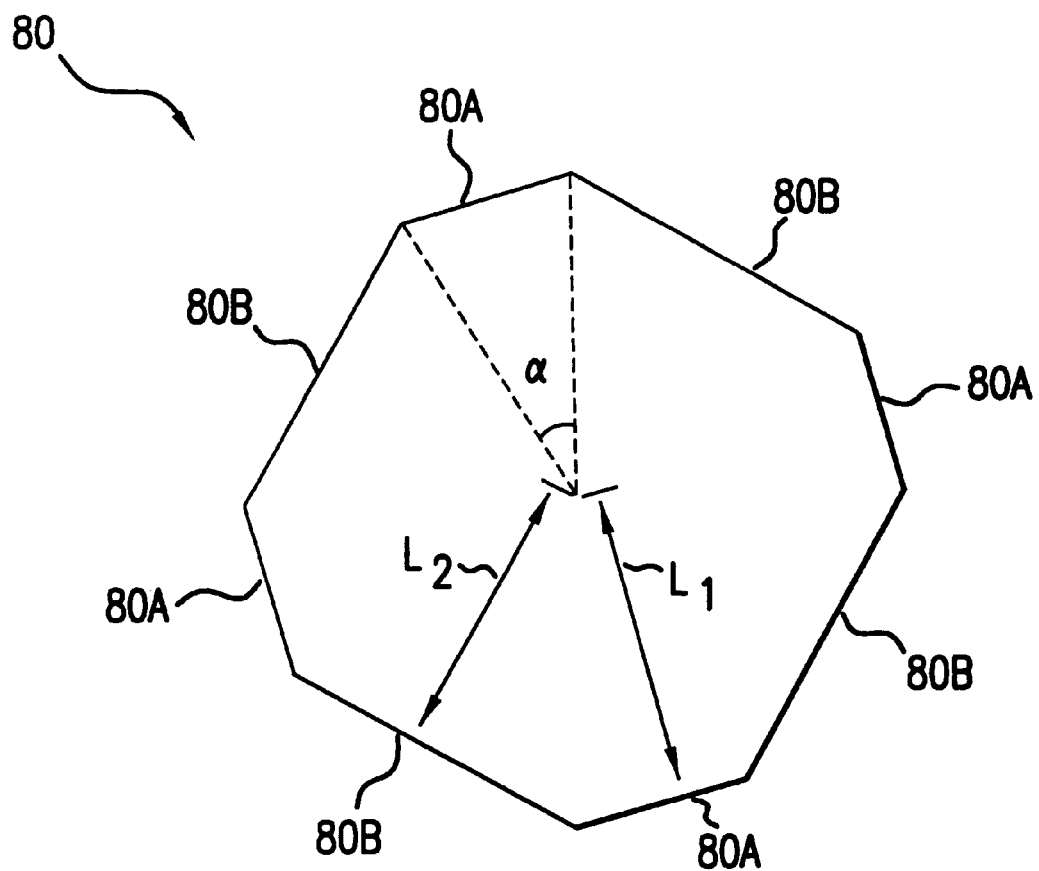
FIGS. 9A and 9B are a plan view and a side view showing a polygon mirror which is a second embodiment of the invention.
Figure 9B:
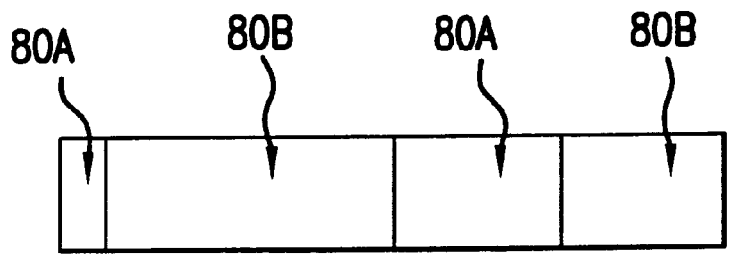

The second embodiment uses a polygon mirror 80 while the first embodiment uses the polygon mirror 36. The polygon mirror 80 is configured such that center angles $\alpha$ of a plural number of reflecting surfaces are $\alpha 1$, $\alpha 2$, $\alpha 1$, $\alpha 2$, . . . ($\alpha 1 \neq \alpha 2$) in this order in the rotational direction of the polygon mirror; each bottom surface of the polygon mirror is an irregular polygon. Here, the center angle $\alpha$ is an angle defined by a pair of line segments (indicated by broken lines in FIG. 8) connecting the center of rotation of the polygon mirror 80 to both ends of each reflecting surface of the polygon mirror when viewed in the rotational direction thereof. As seen also from FIG. 9, the reflecting surfaces 80A having small center angle $\alpha$ are small in width in the main scan direction and long in distance (=Li from the peripheral edges to the center of rotation, while the reflecting surfaces having the large center angle $\alpha$ are large in width in the main scan direction and long in distance (=L2).

In the thus faceted polygon mirror 80, the reflecting surfaces 80A (referred to as narrow reflecting surfaces) being narrow in width in the rotational direction of the polygon mirror and the reflecting surfaces 80B (referred to as wide reflecting surfaces) being wide in width are alternately arrayed in the rotational direction of the polygon mirror. The polygon mirror 80 corresponds to a polygon mirror in aspect 6, and that in aspect 2.

The polygon mirror 80 of the second embodiment, like the polygon mirror 36 of the first embodiment, the narrow reflecting surfaces 80A corresponding to the coating facet 36A and the wide reflecting surfaces 80B corresponding to the non-coating facet 36B are alternately arrayed in the mirror rotational direction. Therefore, if laser beams A and B emitted from the LD 26 are modulated through the exposure control process described in the first embodiment, the entire exposure areal range on the surface of the photoreceptor 12 can be scanned with the laser beam modulated by the image data and the laser beam modulated by the bias data as the inverted image data.

The distance to the rotation center of the narrow reflecting surfaces 80A of the polygon mirror 80 is long, and hence optical length thereof from the reflecting surface to the photoreceptor 12 is shorter than that in the wide reflecting surfaces 80B.

The optical path length from the reflecting surface to the photoreceptor 12 in the narrow reflecting surfaces 80A is different from that in the wide reflecting surfaces 80B. Therefore, the beam waist position of the laser beam in the vertical scan direction on the optical path ranging from the LD 26 to the photoreceptor 12 when the laser beam is deflected by the narrow reflecting surfaces 80A is different from that when it is deflected by the wide reflecting surfaces 80B. This is disadvantageous.

To cope with this, in the second embodiment, the beam waist position of the laser beam incident on the polygon mirror 80 in the vertical scan direction coincides in position with the wide reflecting surface 80B when it deflects the laser beam, and the photoreceptor 12 is positioned relative to the optical scanning device 14 so that an exposure position on the surface of the photoreceptor 12 is conjugate with a position of the wide reflecting surfaces 80B at this time. In this way, the beam waist position of the laser beam modulated by the image data and deflected by the wide reflecting surfaces 80B can be coincident in position with the surface of the photoreceptor 12.

The beam waist position of the laser beam in the vertical direction when the laser beam is deflected by the narrow reflecting surfaces 80A is displaced from the surface of the photoreceptor 12. Therefore, a banding, called a wobble, possibly occurs. When the laser beam is deflected by the narrow reflecting surfaces 80A, the laser beam is modulated by the bias data, and the modulated beam lands on the surface of the photoreceptor 12, with light power thereof to such an extent that the photoreceptor 12 is kept at a potential above a developing potential. Therefore, the above banding phenomenon does not appear.

Where the polygon mirror 80 is used, the optical path length from the reflecting surface to the photoreceptor 12 in the narrow reflecting surfaces 80A is different from that in the wide reflecting surfaces 80B, as described above. Because of this, the radiation position of the laser beam when it is deflected by the narrow reflecting surfaces 80A is disadvantageously displaced, in the vertical scan direction, from that when it is deflected by the wide reflecting surfaces 80B.

In the second embodiment, the optical elements (e.g., collimator lens 44) having their power in the vertical or slow scan direction of an optical system (scan optical system in the present invention) disposed between the polygon mirror 80 and the photoreceptor 12 are designed so that the optical system functions as a reduction optical system where physical distance s (when viewed in the slow scan direction) >image distance s'. With the design, the irradiation position of the laser beam on the surface of the photoreceptor 12 when it is deflected by the narrow reflecting surface 80A is less displaced from that when it is deflected by the wide reflecting surface 80B. Incidentally, the optical system disposed between the polygon mirror 80 and the photoreceptor 12 corresponds to a scan optical system in aspect 8.

<Third Embodiment>

A third embodiment of the present invention will be described. Like or equivalent portions are designated by like reference numerals used in the first embodiment. The third embodiment will be described placing emphasis on only portions different from those or not found in the first embodiment.

In the optical scanning device having a multi-beam laser with a plural number of light emitting points as a light source, a magnification of the optical system in the slow scan direction is determined by a spatial interval between adjacent irradiation positions of the plural number of laser beams on the target member. Therefore, when the spatial interval between the light emitting points of the multi-beam laser is larger than that between the laser beams on the target member, some measure must be taken. For example, the beam diameter of the laser beam incident on the surface of the photoreceptor 12 when viewed in the slow scan direction is increased by setting the magnification of the optical system in the slow scan direction at a small value of magnification to reduce the interval between the irradiation positions of the laser beams, and by reducing the beam width of the laser beam by use of a slit located in the optical path of the laser beam. Otherwise, the energy of the laser beam is inefficiently utilized and sometimes the exposure power is insufficient.

In the first embodiment, the two laser beams A and B emitted from the LD 26 are projected to the photoreceptor 12 surface at positions spaced from each other in the slow scan direction a distance corresponding to the line-to-line interval of the image to be formed. Exposure of two adjacent lines is performed through one scan. Therefore, the distance between the two laser beams on the surface of the photoreceptor 12 corresponds to the resolution of the image to be formed in the slow scan direction. Attempt to increase the resolution of the image in the slow scan direction possibly encounters the problem mentioned above.

For this reason, the collimator lens 44 is designed such that the two laser beams A and B emitted from the LD 26 land at positions spaced in the slow scan direction a distance corresponding to line-to-line interval of the image to be formed×m ($m \geq 2$).

Figure 10A:
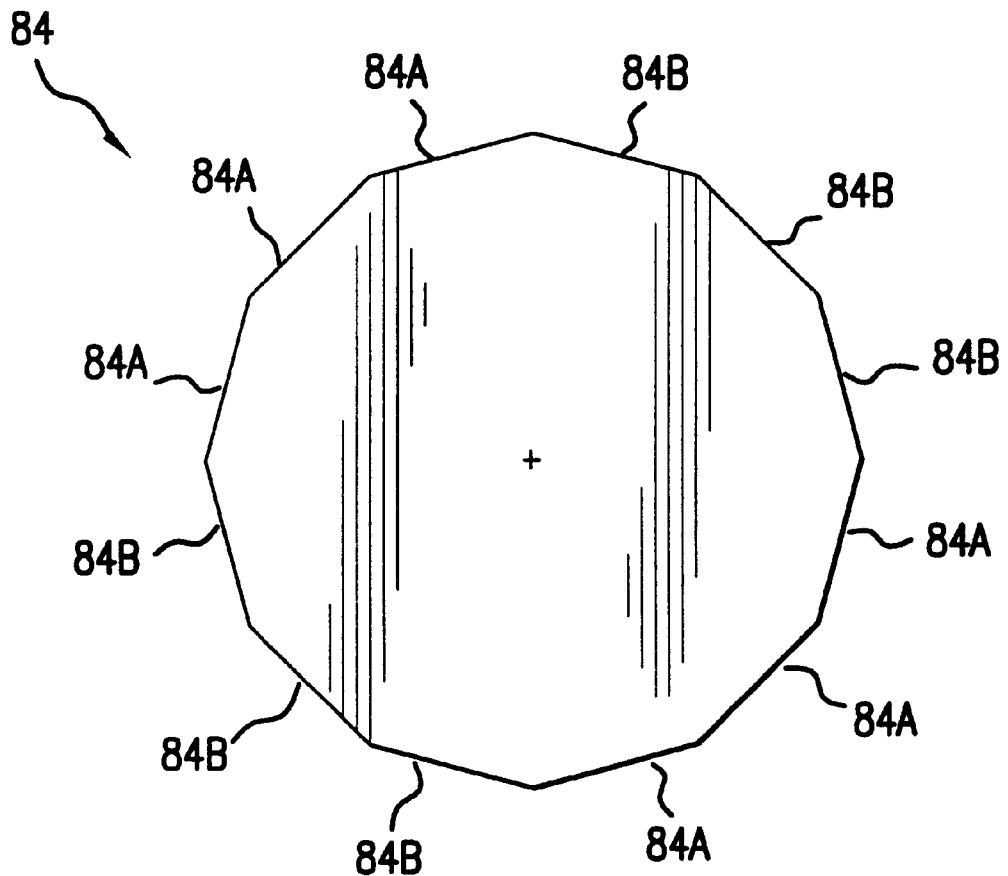
FIGS. 10A and 10B are a plan view and a side view showing a polygon mirror which is a third embodiment of the invention.
Figure 10B:
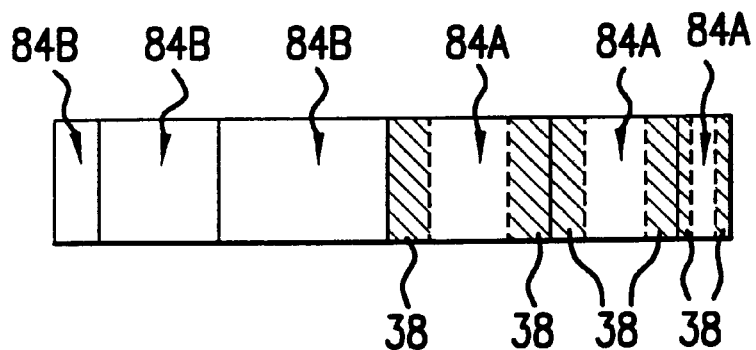

The third embodiment uses a polygon mirror 86 as shown in FIG. 10 in place of the polygon mirror 36 used in the first embodiment. The polygon mirror 86, like the polygon mirror 36, consists of a regular N prism. A group of m (m=3 in FIG. 10) number of coating facets 84A with coatings 38, like the coating facets 36A of the polygon mirror 36, and another group of m number of non-coating facets 84B, like the non-coating facets 36B are alternately arrayed in the rotational direction of the polygon mirror. The polygon mirror 84 corresponds to a polygon mirror in aspect 4 (more specifically, a polygon mirror in aspects 5 and 10).

In the third embodiment, a rotational speed of the photoreceptor 12 is selected such that the peripheral surface of the photoreceptor 12 is moved in the slow scan direction a spatial interval between the adjacent lines of an image to be formed.

Also in the third embodiment, the (line number of) image data from the input portion 60, image data stored in the buffer 64, and the data to be output to the modulators 68A and 68B are controlled as shown in Table 1. Table 1 is tabulated for a case where m=3. In the table, Mx is image data of the X-th line, and Bx is bias data of the X-th line.

TABLE 1

| Line No. | Data stored in buffer | Output of modulator 68A | Output of modulator 68B |
|---|---|---|---|
| 1 | M1 | — | B1 |
| 2 | M1, M2 | — | B2 |
| 3 | M1, M2, M3 | — | B3 |
| 4 | M2, M3, M4 | M1 | M4 |
| 5 | M3, M4, M5 | M2 | M5 |
| 6 | M4, M5, M6 | M3 | M6 |
| 7 | M5, M6, M7 | B4 | B7 |
| : | : | : | : |

Figure 11:
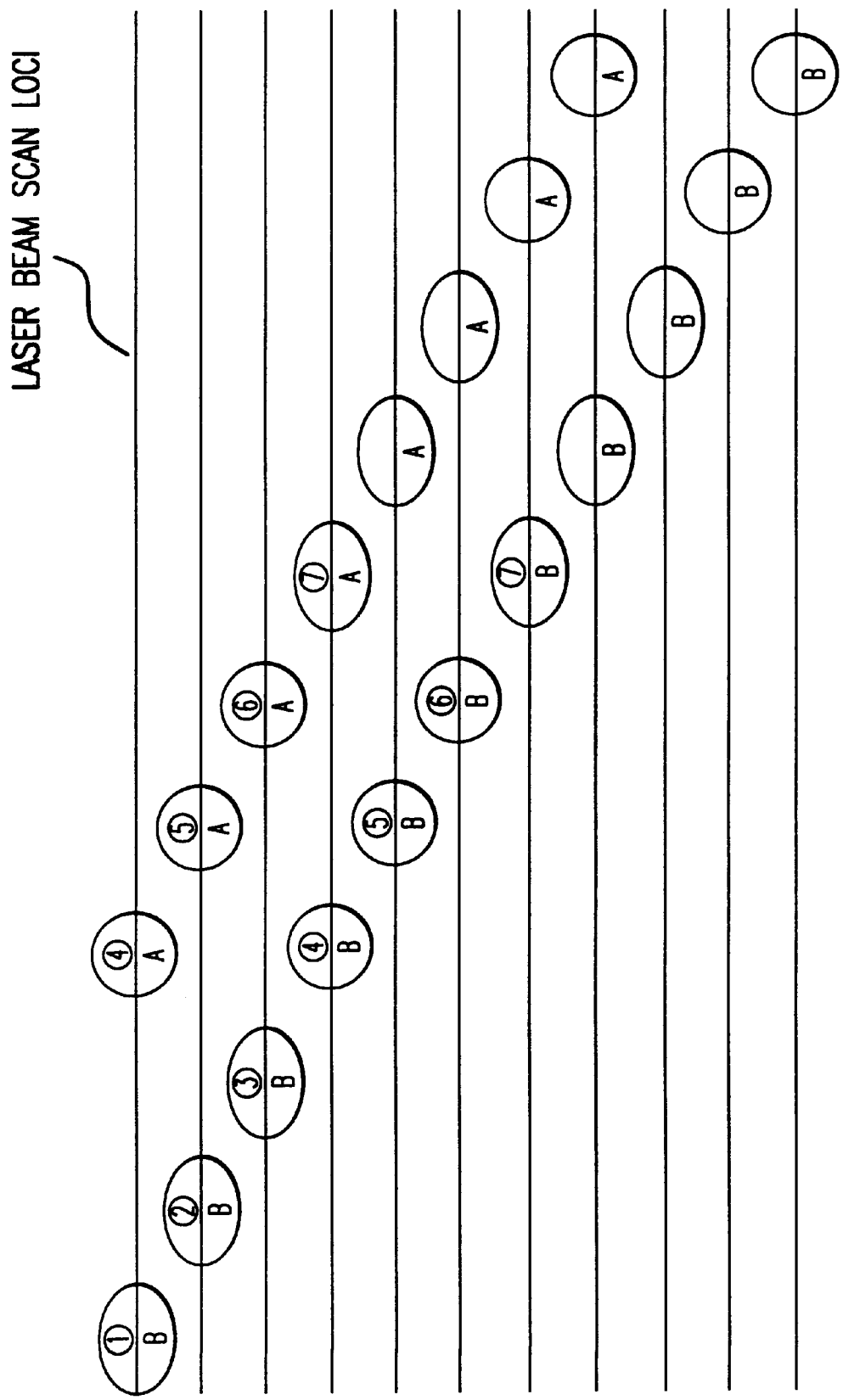
FIG. 11 is a sequence diagram showing a sequence of scan by use of two laser beams in the third embodiment.
Figure 12:
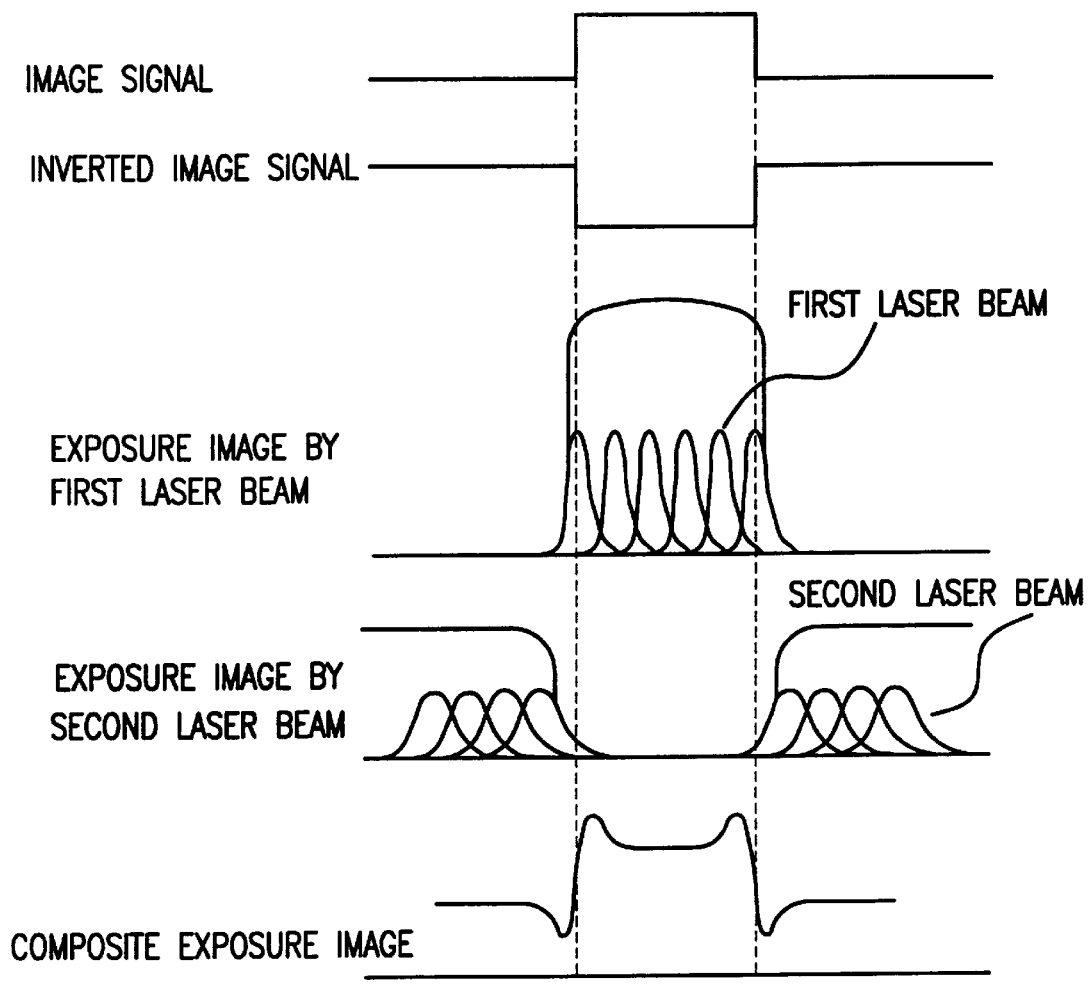
FIG. 12 is a timing chart for explaining an exposure method to produce an electrostatic latent image of high contract by using two light beams, a first light beam being narrow in width but high in power and a second light beam being wide in beam width but low in power.
Figure 13:
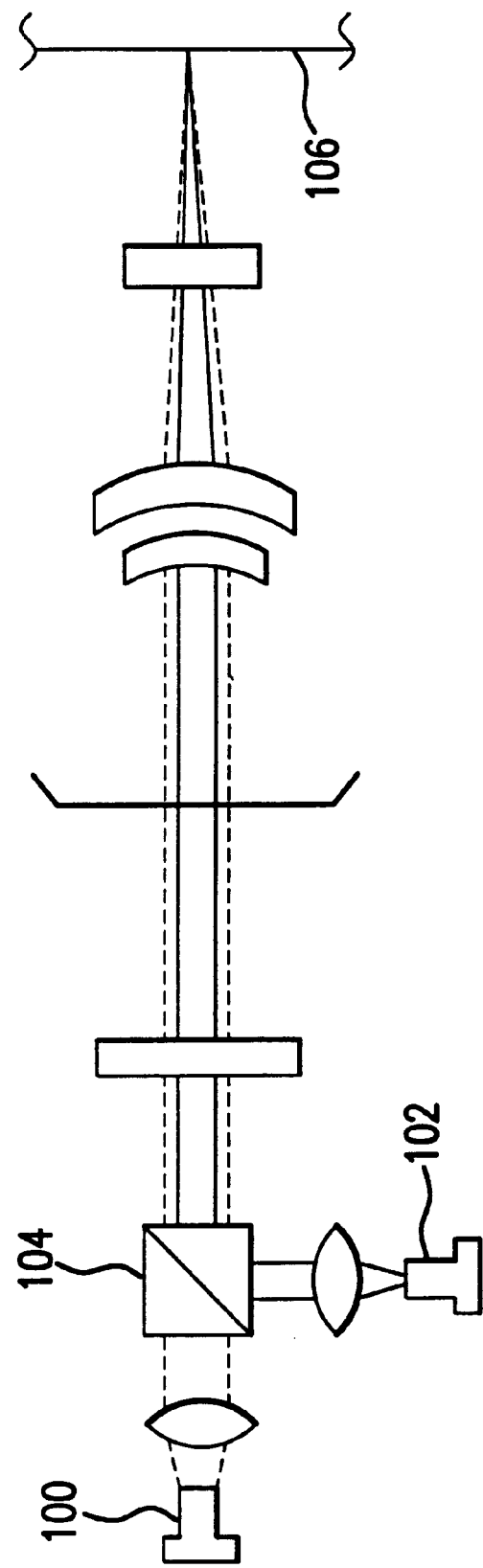
FIG. 13 is a diagram showing an optical scheme of an optical system for realizing the exposure method of FIG. 12.
Figure 14A:
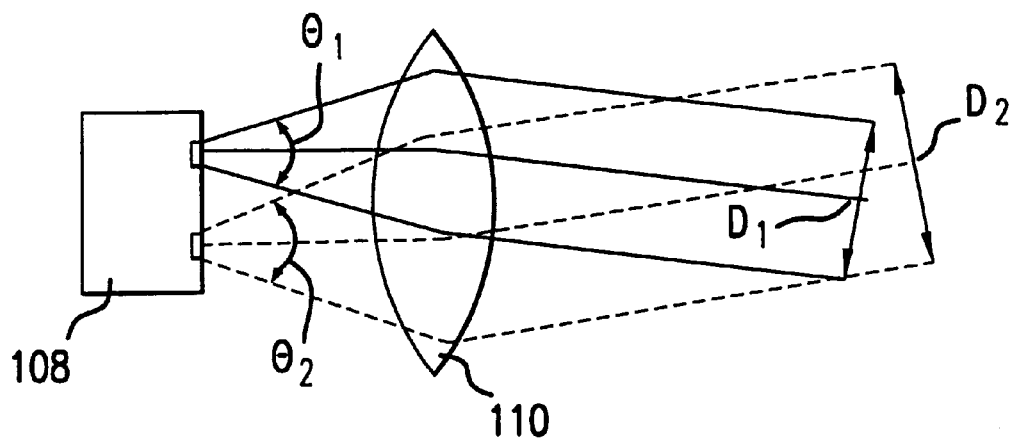
FIGS. 14A to 14C are diagrams showing the optical schemes of other optical systems for realizing the exposure method of FIG. 12.
Figure 14B:
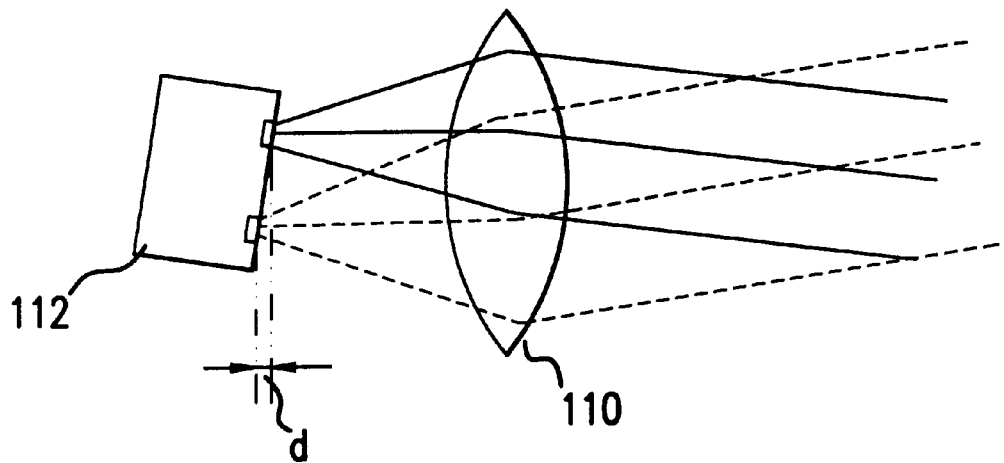
Figure 14C:
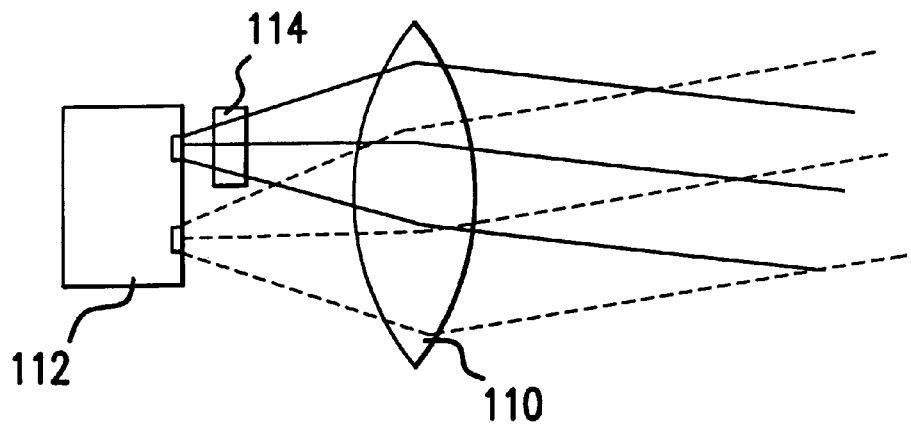

In first three scans ((1) to (3) in FIG. 11), only the laser beams B modulated by the bias data B1, B2 and B3 of the first to third lines are deflected by the non-coating facets 84B form light spots having large irradiation beam diameter on the surface of the photoreceptor 12. In the forth to sixth scans ((4) to (6) in FIG. 11), the laser beam A is modulated by image data M1, M2 and M3, while the laser beam B is modulated by image data M4, M5 and M6, and the laser beams A and B are deflected by the coating facets 84A and form light spots having large irradiation beam diameter on the photoreceptor surface. Those light spots scan the surface of the photoreceptor 12 while being spaced in the slow scan direction a distance corresponding to "line-to-line interval× 3".

In the seventh scan ((7) in FIG. 11) to the eighth scan ((9) in FIG. 11), the laser beams A and B are modulated by bias data (bias data B4, B7 in the seventh scan), and deflected again by the non-coating facets 84B and form light spots of large beam diameter. Repeating the scan sequence, the entire exposure areal range on the surface of photoreceptor 12 are exposed (overwritten) to the laser beam modulated by the image data and the laser beam modulated by the bias data as the inverted image data.

In the third embodiment, the laser beams A and B are projected on the peripheral surface of the photoreceptor 12 at positions spaced from each-ether in the slow scan direction a distance corresponding to "line-to-line interval×3". Also when the light source having a large distance between the adjacent light emitting points is used, there is no need of taking a measure such that the beam diameter of the laser beam incident on the surface of the photoreceptor 12 when viewed in the slow scan direction is increased by setting the magnification of the optical system in the slow scan direction at a small value of magnification to reduce the interval between the irradiation positions of the laser beams, and by reducing the beam width of the laser beam by use of a slit located in the optical path of the laser beam. Hence, the energy of the laser beam can efficiently be utilized.

In each of the first to third embodiments, a light source has a plural number of light emitting points. If required, a light source having a single light emitting point may be used within the scope of the invention.

As seen from the foregoing description, the reflecting surfaces of a polygon mirror for deflecting light beams that are emitted from a light source are designed to have different widths when viewed in the rotational direction of the polygon mirror. This accrues to advantages of forming an image of high contrast and securing easy manufacturing.

What is claimed is:

1. An optical scanning device comprising:
   a light source that emits a light beam;
   a rotating polygon mirror that receives a light beam from said light source, said polygon mirror having a plural number of reflecting surfaces arrayed in a rotational direction of said polygon mirror, said reflecting surfaces being different from one another in their width when viewed in the rotational direction;
   a scan optical system that scans a target member with a light beam deflected by said polygon mirror; and
   a modulation circuit that modulates the light beam deflected by a wide one of the reflecting surfaces by an image signal representative of an image to be formed on the target member, the modulation circuit modulating the light beam deflected by a narrower one of the reflecting surfaces by an image signal formed by inverting the image signal representational of the image to be formed on the target member.

2. The optical scanning device according to claim 1, wherein said light source has (2×n) number of light emitting points arrayed in a direction intersecting the rotational direction of said polygon mirror, where n is an integer greater than 0,
   said reflecting surfaces that are wide in width and said reflecting surfaces that are narrow in width are alternately arrayed on said polygon mirror in the rotational direction, and
   said target member is moved in a slow scan direction by a distance corresponding to a result of multiplying a spatial interval between adjacent scan loci of the light beam on said target member by the n every time said target member is scanned with the light beam.

3. The optical scanning device according to claim 1, further comprising:
   an incident optical system for transforming light beams emitted from said light source into a bundle of light beams, a width of the bundle of light beans being wider than the width of each reflecting surface when viewed in the rotational direction.

4. The optical scanning device according to claim 1, wherein
   each reflecting surface is partially coated in the rotational direction with a reflectivity-reducing material so that the width of each reflecting surface is substantially reduced in the rotational direction.

5. The optical scanning device according to claim 1, wherein
   both ends of each reflecting surface are symmetrically coated in the rotational direction with a reflectivity-reducing material so that the width of each reflecting surface is substantially reduced in the rotational direction.

6. The optical scanning device according to claim 1, wherein
   said plural number of reflecting surfaces of said polygon mirror have different distances ranging to the center of rotation of said polygon mirror so that said reflecting surfaces are different in width when viewed in the rotational direction.

7. The optical scanning device according to claim 6, wherein
   said scan optical system functions as a reduction optical system in the slow scan direction.

8. The optical scanning device according to claim 2, further comprising:
   storage means capable of storing at least n number of lines of image data from said storage means,
   input means for sequentially inputting n number of lines of image data; and
   control means for executing controls such that
   1) every time n number of lines of image data is input by said input means, said control means reads out n number of lines of image data from said storage means,
   2) a light beam is deflected by any of said reflecting surfaces having a wide width when viewed in the rotational direction, said control means causes a modulation of 2n number of light beams emitted from said light source by n number of lines of input image data and n number of lines of readout image data, and
   3) a light beam is deflected by any of said reflecting surfaces having a narrow width when viewed in the rotational direction, said control means
      a) inverts said light source by said n number of lines of input image data and n number of lines of readout image data, b) causes a modulation of 2n number of light beams emitted from said light source by said n number of lines of inverted input image data and the n number of lines of inverted readout image data, and c) stores n number of lines of input image data into said storage means.

9. The optical scanning device according to claim 1, wherein said light source has a pair of light emitting points arrayed in the direction intersecting the rotational direction of said polygon mirror, said reflecting surfaces that are wide in width and said reflecting surfaces that are narrow in width are alternately arrayed every group of m number of reflecting surfaces on said polygon mirror in the rotational direction, where m is an integer greater than 0, said scan optical system is arranged such that two light beams deflected by said polygon mirror land on said target member at positions spaced from each other in a slow scan direction by a distance corresponding to a result of multiplying a spatial interval between adjacent scan loci of the light beam by the m, and said target member is moved in the slow scan direction by a distance corresponding to a spatial interval between adjacent scan loci of the light beam on said target member very time said target member is scanned with the light beam.

10. The optical scanning device according to claim 1, further comprising:

a detector so disposed as to receive the light beam when the light beam is deflected to a scan start end by said polygon mirror; and a modulation circuit control portion that judges a width of at least one of said reflecting surfaces which reflects the light beam on the basis of an amount of light detected by said detector when said detector receives the light beam, and controls a modulation of the light beam in accordance with the determined width.

11. An optical scanning device comprising:

a light source that emits a light beam;

a rotating polygon mirror that receives the light beam from the light source, the polygon mirror having a plural number of reflecting surfaces arrayed in a rotational direction of the polygon mirror, at least one of the plural number of reflecting surfaces being of a first type and at least one of the plural number of reflecting surfaces being of a second type;

a scan optical system that scans a target member with a light beam deflected by the polygon mirror; and a modulation circuit that modulates the light beam deflected by the first type of reflecting surface by an image signal representative of an image to be formed on the target member, the modulation circuit modulating the light beam deflected by the second type of reflecting surface by an image signal formed by inverting the image signal representational of the image to be formed on the target member.

12. The optical scanning device according to claim 11, wherein the light source has (2×n) number of light emitting points arrayed in a direction intersecting the rotational direction of the polygon mirror, where n is an integer greater than 0, the first type of reflecting surfaces and the second type of reflecting surfaces are alternately arrayed on the polygon mirror in the rotational direction, and the target member is moved in a slow scan direction by a distance that is the result of multiplying a spatial interval between adjacent scan loci of the light beam on the target member by the n every time the target member is scanned with the light beam.

13. The optical scanning device according to claim 1, further comprising:

an incident optical system for transforming light beams emitted from the light source into a bundle of light beams, a width of the bundle of light beams being wider than the width of each reflecting surface when viewed in the rotational direction.

14. The optical scanning device according to claim 11, wherein each reflecting surface is partially coated in the rotational direction with a reflectivity-reducing material so that the width of each reflecting surface is substantially reduced in the rotational direction.

15. The optical scanning device according to claim 11, wherein both ends of each reflecting surface in the rotational direction are symmetrically coated with a reflectivity-reducing material so that the width of each reflecting surface is substantially reduced in the rotational direction.

16. The optical scanning device according to claim 11, wherein said plural number of reflecting surfaces have different distances ranging to a center of rotation of the polygon mirror so that the reflecting surfaces are different in width when viewed in the rotational direction.

17. The optical scanning device according to claim 16, wherein the scan optical system functions as a reduction optical system in the slow scan direction.

18. The optical scanning device according to claim 12, further comprising:

a storage device that stores at least n number of lines of image data from the storage means, an input device that sequentially inputs n number of lines of image data; and a controller that controls the storage device and the modulation circuit, such that a) n number of lines of image data are read out from the storage device every time n number of lines of image data are input by the input device, b) 2n number of light beams emitted from the light source are modulated by the n number of lines of read out image data when the light beams are deflected by the first type of reflecting surfaces, c) the light source is inverted by the n number of lines of readout image data, 2n number of light beams emitted from the light source are modulated by the n number of lines of inverted readout image data, and n number of lines of input image data are stored into the storage device when the light beams are deflected by the second type of reflecting surfaces.

19. The optical scanning device according to claim 11, wherein the light source has a pair of light emitting points arrayed in the direction intersecting the rotational direction of the polygon mirror, the first type of reflecting surfaces and the second type of reflecting surfaces are alternately arrayed every group of m number of reflecting surfaces on the polygon mirror in the rotational direction, where m is an integer greater than 0, the scan optical system is arranged such that two light beams deflected by the polygon mirror land on the target member at positions spaced from each other in a slow scan direction by a distance that is a result of multiplying a spatial interval between adjacent scan loci of the light beam by the m, and the target member is moved in the slow scan direction by a distance corresponding to a spatial interval between adjacent scan loci of the light beam on the target member very time the target member is scanned with the light beam.

20. The optical scanning device according to claim 11, further comprising:

a detector so disposed as to receive the light beam when the light beam is deflected to a scan start end by the polygon mirror; and a modulation circuit control portion that determines a width of at least one of the reflecting surfaces which reflects the light beam on the basis of an amount of light detected by the detector when the detector receives the light beam, and controls the modulation circuit to control modulation of the light beam in accordance with the determined width.

* * * * *